(12) United States Patent
Baek et al.

(10) Patent No.: US 10,661,891 B2
(45) Date of Patent: May 26, 2020

(54) UNMANNED AERIAL VEHICLE

(71) Applicant: Samsung Electronics Co., Ltd., Gyeonggi-do (KR)

(72) Inventors: Sang-In Baek, Gyeonggi-do (KR); Young-Bae Lee, Gyeonggi-do (KR); Uy-Hyeon Jung, Gyeonggi-do (KR); Byoung-Uk Yoon, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 433 days.

(21) Appl. No.: 15/448,855

(22) Filed: Mar. 3, 2017

(65) Prior Publication Data
US 2017/0283050 A1    Oct. 5, 2017

(30) Foreign Application Priority Data
Mar. 30, 2016  (KR) .................. 10-2016-0038148

(51) Int. Cl.
*B64C 27/50* (2006.01)
*B64C 27/08* (2006.01)
(Continued)

(52) U.S. Cl.
CPC .............. *B64C 27/50* (2013.01); *B64C 27/08* (2013.01); *B64C 27/48* (2013.01); *B64C 39/024* (2013.01);
(Continued)

(58) Field of Classification Search
CPC ... B64C 27/50; B64C 27/48; B64C 2201/027; B64C 2201/108
See application file for complete search history.

(56) References Cited

U.S. PATENT DOCUMENTS 5,743,489 A   4/1998  Stemme
6,550,719 B2 * 4/2003  Konig ................... B64C 11/28
                                                    244/16
(Continued)

FOREIGN PATENT DOCUMENTS

CN    204507252    7/2015
CN    105000163   10/2015
(Continued)

OTHER PUBLICATIONS

European Search Report dated Aug. 17, 2017 issued in counterpart application No. 17161316.9-1754, 10 pages.

*Primary Examiner* — Brian M O'Hara
(74) *Attorney, Agent, or Firm* — The Farrell Law Firm, P.C.

(57) ABSTRACT

An unmanned aerial vehicle (UAV) is provided, which includes a main body; a plurality of frames each extending from the main body; and a plurality of thrust generating devices respectively mounted on the plurality of frames, each of the thrust generating devices including a propeller. The propeller includes a hub that provides a rotation axis of the propeller, and rotates according to an operation of the thrust generating device, and a pair of blades, each of which is pivotably mounted on the hub, and generates a thrust or lift while rotating around the rotation axis as the hub is rotated. The blades are pivotably interlocked with each other such that the blades are aligned to a folded position in which the blades are parallel with each other on the hub in a first arrangement or aligned to an expanded position in a diametric direction of a rotating region of the propeller in a second arrangement.

16 Claims, 20 Drawing Sheets

(51) Int. Cl.
*B64C 27/48* (2006.01)
*B64C 39/02* (2006.01)
(52) U.S. Cl.
CPC .. *B64C 2201/024* (2013.01); *B64C 2201/027* (2013.01); *B64C 2201/108* (2013.01); *B64C 2201/127* (2013.01); *B64C 2201/20* (2013.01)

(56) References Cited

U.S. PATENT DOCUMENTS

| | | | | |
|---|---|---|---|---|
| 8,317,470 | B2 * | 11/2012 | Villella | F04D 25/088 416/140 |
| 10,155,585 | B2 * | 12/2018 | Johannesson | B64C 27/50 |
| 2016/0001879 | A1 | 1/2016 | Johannesson et al. | |
| 2018/0257769 | A1 * | 9/2018 | Goldstein | B64C 27/50 |

FOREIGN PATENT DOCUMENTS

| | | |
|---|---|---|
| DE | 1 431 201 | 1/1969 |
| DE | 4119810 | 12/1992 |
| DE | 4420219 | 12/1995 |
| FR | 768964 | 8/1934 |
| JP | 2001141396 | 5/2001 |
| WO | WO 2014/141154 | 9/2014 |
| WO | WO 2015/179797 | 11/2015 |

* cited by examiner

UNMANNED AERIAL VEHICLE

PRIORITY

This application claims priority under 35 U.S.C. § 119(a) to Korean Application Serial No. 10-2016-0038148, which was filed in the Korean Intellectual Property Office on Mar. 30, 2016, the entire content of which is incorporated herein by reference.

BACKGROUND

1. Field of the Disclosure

The present disclosure relates generally to an aerial vehicle, e.g., an unmanned aerial vehicle (UAV).

2. Description of the Related Art

In general, a UAV flies by being guided by radio waves, according to a previously input program, or by recognizing and determining a surrounding environment (an obstacle, an air-way, etc.) and navigating through the determined environment by itself. The UAV may also be referred to as a "drone".

A UAV equipped with an optical sensor, an infrared sensor, a radar sensor, etc., may be utilized for military purposes, such as surveillance, reconnaissance, guiding a precision weapon, and communication/information repeating. Further, a UAV may be used in the private sector to monitor and prevent accidents or mishaps, monitor geographic and environmental changes, conduct research and development, image capture, ship items, communicate, etc.

As private recreational UAVs have appeared in addition to those for use in the private sectors including image capturing, shipping (such as parcel-shipping), communication, etc., the demand for the convenience of movement and storage of UAVs has increased. However, a rotary wing UAV having a rotor or a propeller occupies a considerably wide space when the blades of the propeller are expanded, which may make the UAV difficult to move and/or store.

In order to facilitate the movement and storage of the rotary wing UAV, a propeller having blades that are foldable to be parallel with a propeller rotation axis and a propeller having blades that are foldable to be parallel with each other at one side thereof have been proposed. However, when the blades are folded in parallel with the propeller rotation axis, it is still difficult to store the UAV because the storage space still must accommodate the length of the blades in the direction of the rotation axis. While the blades that are folded to be parallel with each other at one side thereof may facilitate the movement or storage because the blades may be positioned on another structure of the UAV in the folded state, when the propeller rotates, the blades may not maintain a correct position on the propeller (e.g., a position at which the blades are aligned on a 2-blade propeller) due to a drag acting on the blades. For example, when the blades are folded to be parallel with each other at one side thereof, the rotational radius of the propeller may vary depending on an operating state, such that the propeller may suffer from a difficulty in properly exhibiting the designed performance of the UAV.

SUMMARY

The present disclosure has been made to address the above-mentioned problems and disadvantages, and to provide at least the advantages described below.

Accordingly, an aspect of the present disclosure is to provide vehicle UAV having a rotor wing structure that is easy to move or store.

Another aspect of the present disclosure is to provide a UAV having a rotor wing structure that is capable of properly exhibiting a designed performance the UAV.

In accordance with an aspect of the present disclosure, a UAV is provided, which includes a main body; a plurality of frames extending from the main body; and a plurality of thrust generating devices respectively mounted on the plurality of frames, each of the thrust generating devices including a propeller. The propeller includes a hub that provides a rotation axis of the propeller, and rotates according to an operation of the thrust generating device, and a pair of blades, each of which is pivotably mounted on the hub, and generates a thrust or lift while rotating around the rotation axis as the hub is rotated. The blades are pivotably interlocked with each other such that the blades are aligned to a folded position in which the blades are parallel with each other on the hub in a first arrangement or aligned to an expanded position in a diametric direction of a rotating region of the propeller in a second arrangement.

In accordance with another aspect of the present disclosure, an aerial vehicle is provided, which includes a plurality of driving motors, and a plurality of propellers respectively provided to the plurality of driving motors. Each of plurality of the propellers includes a hub that rotates according to an operation of a driving motor to which the propeller is provided; a pair of gears, each of the gears being rotatably mounted on the hub, the gears being disposed to be symmetric to each other with reference to a rotation axis of the hub; and blades that extend from the gears, respectively. The blades pivot between a folded position where the blades are aligned to be parallel with each other and an expanded position where the blades are aligned in a diametric direction of a rotating region of the propeller. The blades rotate around the rotation axis to generate a thrust or lift as the hub rotates, and the gears are engaged with each other to interlock the blades with each other.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
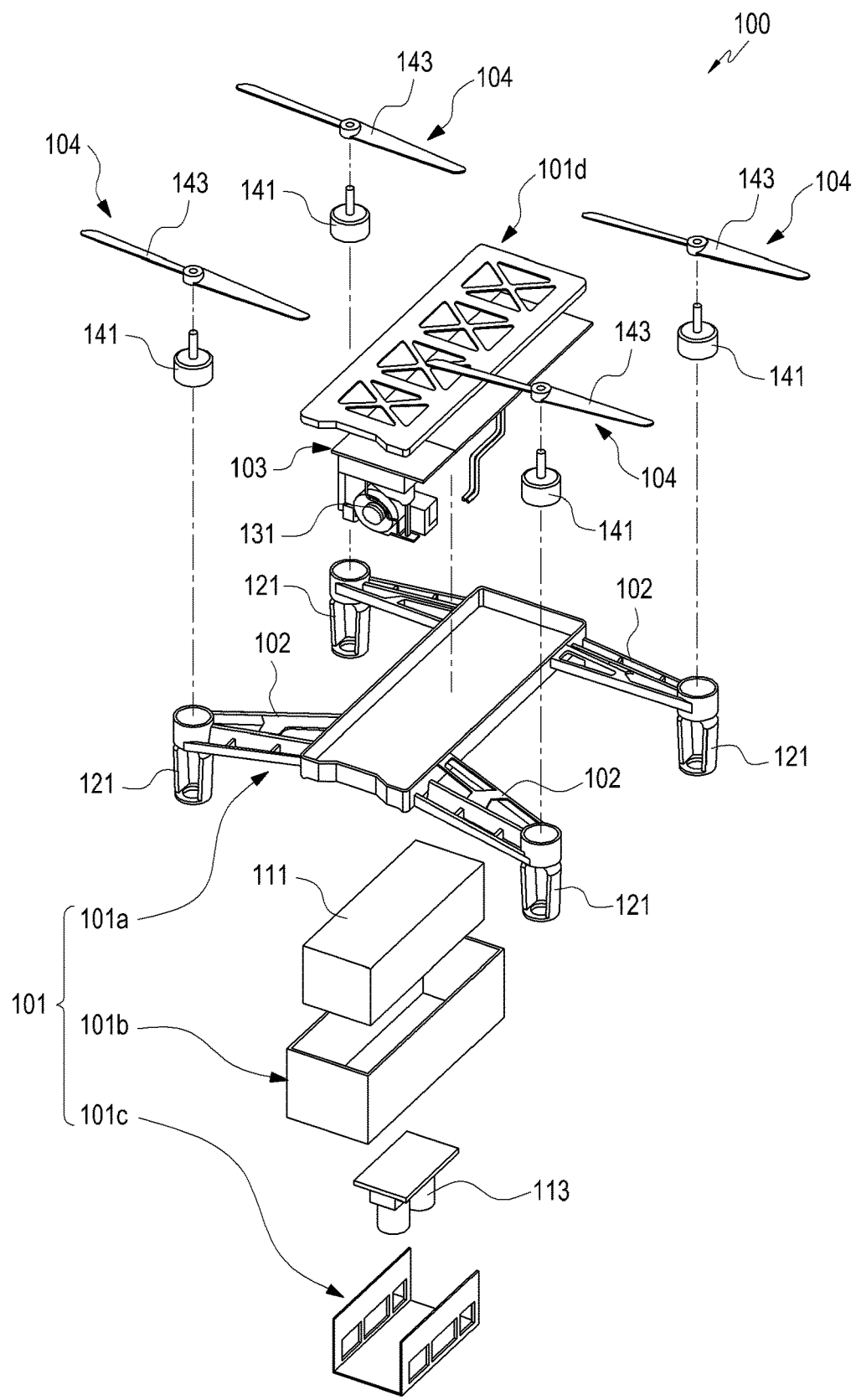
FIG. 1 is an exploded perspective view illustrating a UAV according to an embodiment of the present disclosure.

Hereinafter, various embodiments of the present disclosure will be described with reference to the accompanying drawings. The embodiments and the terms used therein are not intended to limit the technology disclosed herein to specific forms, and the present disclosure should be understood to include various modifications, equivalents, and/or alternatives to the corresponding embodiments. In describing the drawings, similar reference numerals may be used to designate similar constituent elements.

A singular expression may include a plural expression unless they are definitely different in a context.

Herein, the expressions "a first", "a second", "the first", "the second", etc., may modify various components, regardless of the order and/or the importance, but do not limit the corresponding components.

When an element (e.g., a first element) is referred to as being "(functionally or communicatively) connected," or "directly coupled" to another element (e.g., a second element), the first element may be connected directly to the second element or may be indirectly connected to the second element through another element (e.g., a third element).

The expression "configured to" may be interchangeably used with "suitable for", "having the capacity to", "designed to", "adapted to", "made to", or "capable of" in terms of hardware or software, according to context. Alternatively, in some situations, the expression "device configured to" may indicate that the device, together with other devices or components, "is able to". For example, the expression a "processor adapted (or configured) to perform A, B, and C" may indicate a dedicated processor (e.g., an embedded processor) only for performing the corresponding operations or a generic-purpose processor (e.g., a central processing unit (CPU) or an application processor (AP)) that can perform the corresponding operations by executing one or more software programs stored in a memory device.

Figure 2:
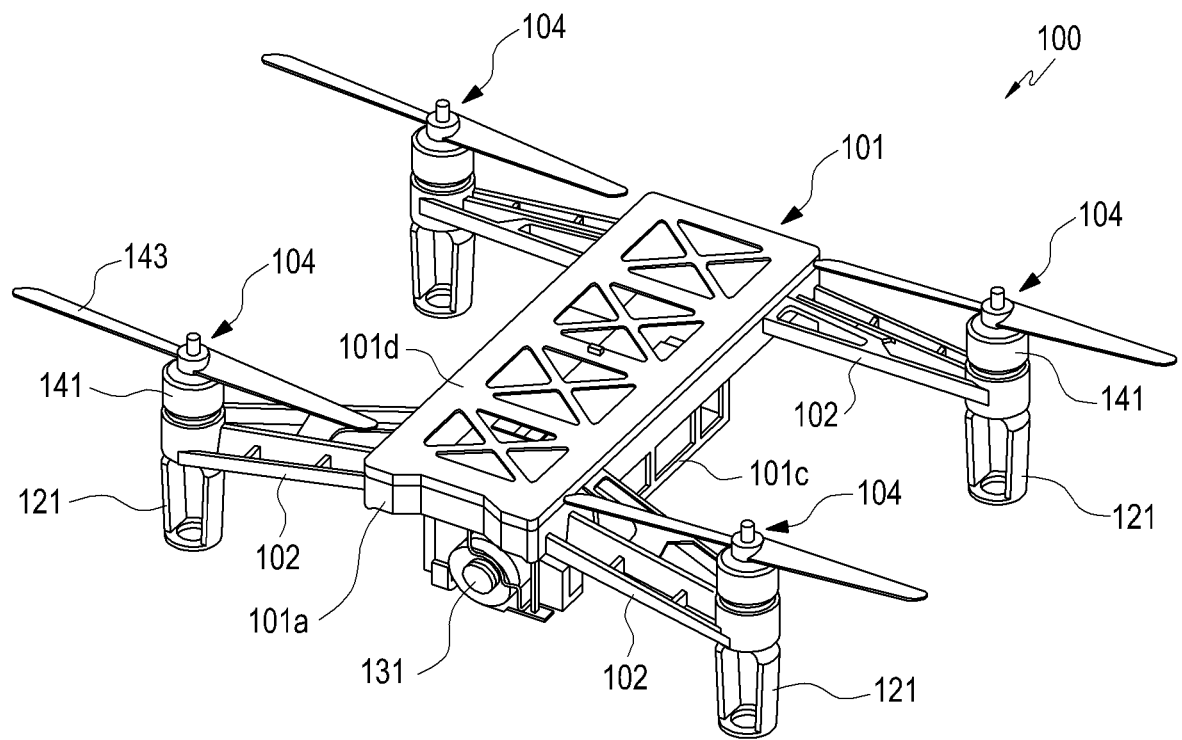
FIG. 2 is a perspective view illustrating the UAV of FIG. 1.
Figure 3:
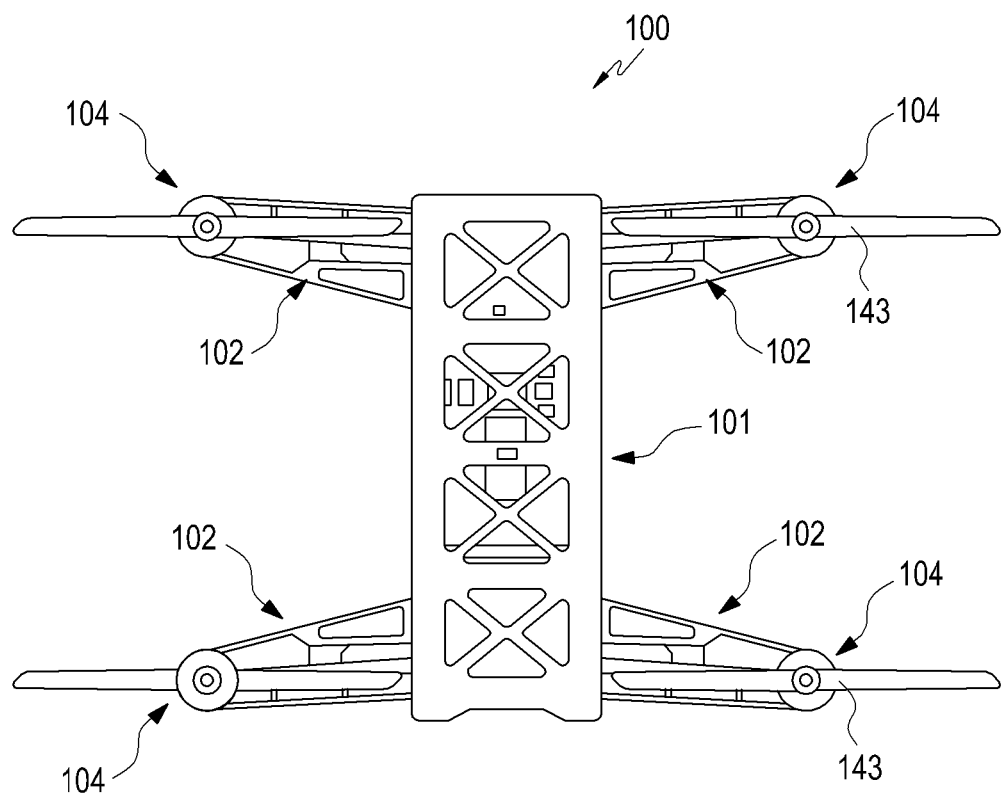
FIG. 3 is a plan view illustrating the UAV of FIG. 1.
Figure 4:
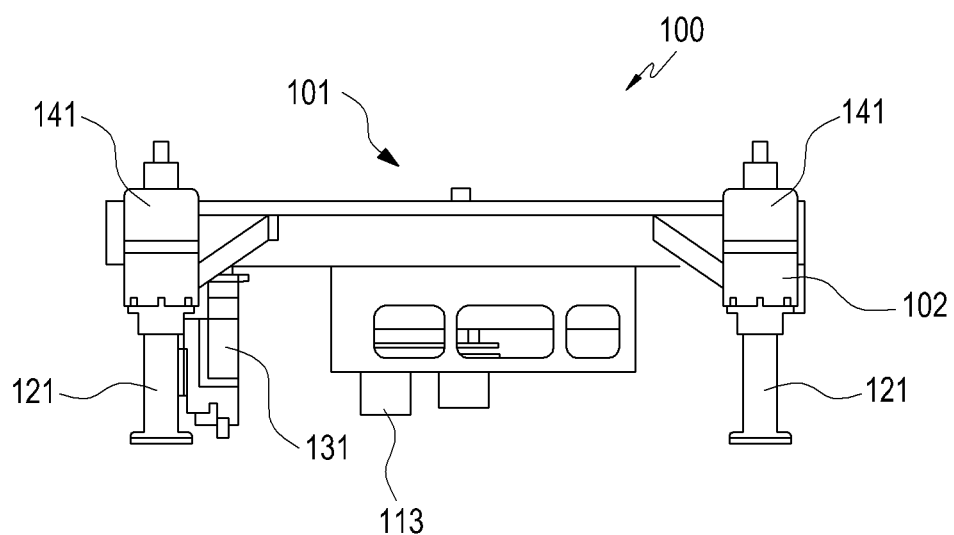
FIG. 4 is a side view illustrating the UAV of FIG. 1.
Figure 5:
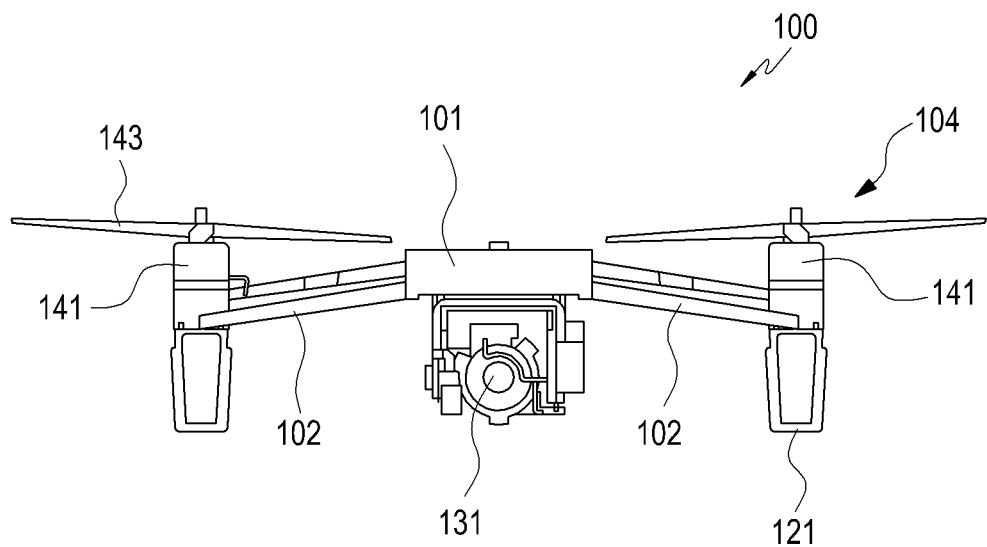
FIG. 5 is a front view illustrating the UAV of FIG. 1.

FIG. 1 is an exploded perspective view illustrating a UAV according to an embodiment of the present disclosure; FIG. 2 is a perspective view illustrating the UAV of FIG. 1; FIG. 3 is a plan view illustrating the UAV of FIG. 1; FIG. 4 is a side view illustrating the UAV of FIG. 1; and FIG. 5 is a front view illustrating the UAV of FIG. 1.

Referring to FIGS. 1 to 5, the UAV 100 may be wirelessly connected to a remote controller (RC), which controls the UAV 100. The RC may include an electronic device, such as a mobile communication terminal or a tablet personal computer (PC). The RC may control a flying direction, a flying speed, a flight altitude by controlling the yaw, pitch, and roll of the UAV 100, the output (e.g., the throttle) of the thrust generating device, etc., through a lever or stick that is movable in multiple directions or a virtual lever that is implemented on a touch pad of an electronic device. The UAV 100 may include a camera device (e.g., a gimbal camera), and the RC (e.g., a smart phone) that controls the UAV 100 may perform a flight control and a camera control at the same time.

An electronic device that functions as the RC may output an image transmitted from the UAV 100 as a preview screen, and a pilot may take a moving image or a still picture while viewing the preview screen.

When the UAV 100 is controlled through a touch pad of an electronic device that functions as the RC, flight control and camera control may be provided in different regions of the touch pad, respectively.

An image taken while the UAV 100 is flying may be output in real time through the electronic device that functions as the RC, and the pilot who operates the electronic device may control the altitude or the flying speed/direction of the UAV 100 based on the output image. The pilot may wear a Virtual Reality (VR) device to control the UAV 100 from the point of view of the UAV 100. The UAV 100 may also recognize and determine surrounding environments (an obstacle, an air-way, etc.) according to a previously input program, by tracking a designated object, or by itself, in order to fly or take an image.

The UAV 100 includes a main body 101, frames 102, and thrust generating devices 104.

The main body 101 includes a first housing 101a, a second housing 101b, a third housing 101c, and a cover member 101d, and accommodates a main circuit board 103, a battery 111, sensor modules 113, and a camera device 131 (e.g., a gimbal camera). The first housing 101a may form and provide a main framework of the UAV 100, and may accommodate the main circuit board 103. The camera device 131 is mounted on the main circuit board 103, such that the camera 131 may protrude to the lower side of the first housing 101a to be partially exposed to the outside. The camera device 131 may take an image while keeping a constant posture or orientation without being shaken even if the UAV 100 is rocked due to vibration according to the operation of the thrust generating devices 104 or the airflow around the UAV 100.

The cover member 101d may be coupled to the top surface of the first housing 101a to conceal and protect the main circuit board 103 accommodated in the first housing 101a. The second housing 101b may be coupled to the bottom surface of the first housing 101a when the second housing 101b accommodates the battery 111. The battery 111 may be provided to be replaceable. For example, in consideration of an estimated flight time, distance, the weight of the UAV 100, etc., the battery 111 may be replaced by another battery that has a larger or smaller power supply capacity.

The third housing 101c may be coupled to the bottom surface of the first housing 101a when the sensor module 113 is mounted thereon. The third housing 101c may be coupled to the first housing 101a when the third housing 101c wraps at least a portion of the second housing 101b.

The sensor module 113 may include a gyro sensor, an ultrasonic sensor, etc., to be capable of detecting a physical amount or a flight environment (e.g., an obstacle) for posture control of the UAV 100.

Depending on an operation purpose or intention of the UAV 100, the third housing 101c and/or the sensor module 113 may be omitted from the first housing 101a. For example, the sensor module 113 may include an optical flow sensor. However, when the optical flow sensor is not needed in operating the UAV 100, the optical flow sensor and/or the third housing 103c may be removed in order to reduce the weight of the UAV 100.

The frames 102 are provided to mount the thrust generating devices 104 thereon, and extend laterally from the main body 101 (e.g., the first housing 101a).

According to the designed specification of the UAV 100, a proper number of frames 102 may be provided. Although the UAV 100 of FIG. 1 is provided with four frames 102, in manufacturing a practical UAV 100, more or less frames may be provided according to the size or weight of the UAV 100 or the performance of the thrust generating device to be equipped in the UAV 100. The frames 102 may be arranged or formed to be symmetric to each other with respect to the center of the UAV 100 (e.g., the center of gravity of the UAV 100 or the central axis of the UAV 100 in the length or width direction). Alternatively, the frames 102 may be asymmetrically arranged depending on the specification of the thrust generating device (e.g., a thrust performance) that is mounted on each of the frames 102.

The frames 102 further include one or more landing gears 121, which prevent the sensor module 113, etc., from coming in contact with the ground when the UAV 100 lands. The landing gears 121 extend downwardly from the bottom surface of the frames 102 to be positioned around the second housing 101b and/or the third housing 101c.

The thrust generating devices 104 generate a flight driving force (e.g., a thrust or a lift) of the UAV 100, and include a plurality of driving motors 141 and propellers 143 mounted on each of the driving motors 141. Each of the driving motors 141 may be mounted on one of the frames 102. For example, each of the driving motors 141 may be mounted on a portion (e.g., an end portion) of one of the frames 102. The rotating region (or rotating plane) of the propellers 143 may be substantially horizontal to the ground, and each of the propellers 143 may generate a force acting in the vertical direction (e.g., the direction opposite to gravity). Because the thrust generating devices 104 are mounted on the portions (e.g., end portions) of the frames 102, the interference of other structures can be suppressed in the region below the rotating plane of the propellers 143. Further, because the thrust generating devices 104 are mounted on the end portions of the frames 102, air flow may be made smooth in the region below the rotating plane of the propellers 143 and the performance of the propellers 143 can be stabilized.

The UAV 100 includes the plurality of thrust generating devices 104, which may generate forces with different magnitudes, respectively. When the thrust generating devices 104 generate forces with different magnitudes, respectively, the resultant force of the forces of the thrust generating devices 104 may act on the UAV 100 in an inclined direction with respect to the ground or the direction of gravity. For example, the resultant force of the forces of the thrust generating devices 104 may act on the UAV 100 as a force (lift) that acts in the direction opposite to the direction of gravity and a force (thrust) that acts in a direction perpendicular to the direction of gravity (e.g., a direction horizontal to the ground). A force that acts in the direction opposite to the direction of gravity is capable of controlling the altitude of the UAV 100 or maintaining a hovering flight state of the UAV 100, and a force that acts in the direction perpendicular to the direction of gravity in the take-off state enables the UAV 100 to advance in a predetermined direction. The thrust generating devices 104 are capable of generating a lift and thrust acting on the UAV 100. According to the resultant force of the forces generated by the thrust generating devices 104, the UAV 100 is capable of adjusting an imaging direction of the camera device 131 while being positioned to be inclined with respect to the direction of gravity (e.g., adjusting a pitch angle or a rolling angle) or turning (e.g., yawing).

Although the UAV 100 of FIGS. 1 to 5 includes the camera device 131 and the sensor module 113, the present disclosure is not necessarily limited thereto. For example, the camera device 131 or the sensor module 113 may be replaced by other various devices or sensors according to an operation purpose or environment of the UAV 100. For example, when the UAV 100 is operated at night, the camera device 131 may be equipped with an image sensor that is capable of detecting infrared rays. When the UAV 100 is operated in order to keep a watch on environmental pollution, the sensor module 113 may include a sensor that detects the density of a chemical substance, fine dust, radioactivity, or the like in the air.

Figure 6:
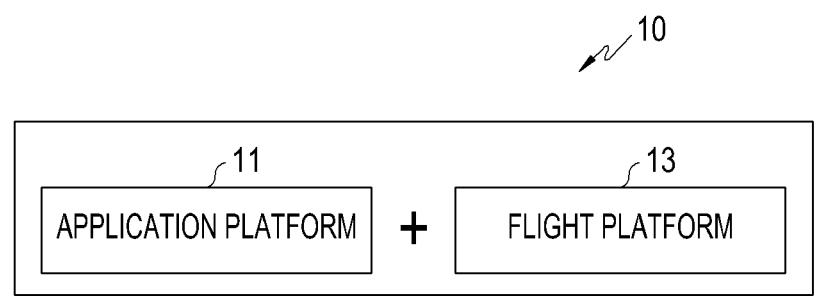
FIG. 6 illustrates platforms of a UAV according to an embodiment of the present disclosure.

FIG. 6 illustrates platforms of an UAV according to an embodiment of the present disclosure.

Referring to FIG. 6, the UAV 10 may include an application platform 11 and a flight platform 13. The application platform 11 may be wirelessly interlocked with another electronic device (e.g., an RC or an electronic device (e.g., a smart phone) that is equipped with an RC function) in order to process a signal for the driving of the UAV 10, service providing, etc. The flight platform 13 may perform a control for the overall flight of the UAV 10 by including a flight control algorithm and/or a navigation algorithm.

Figure 7:
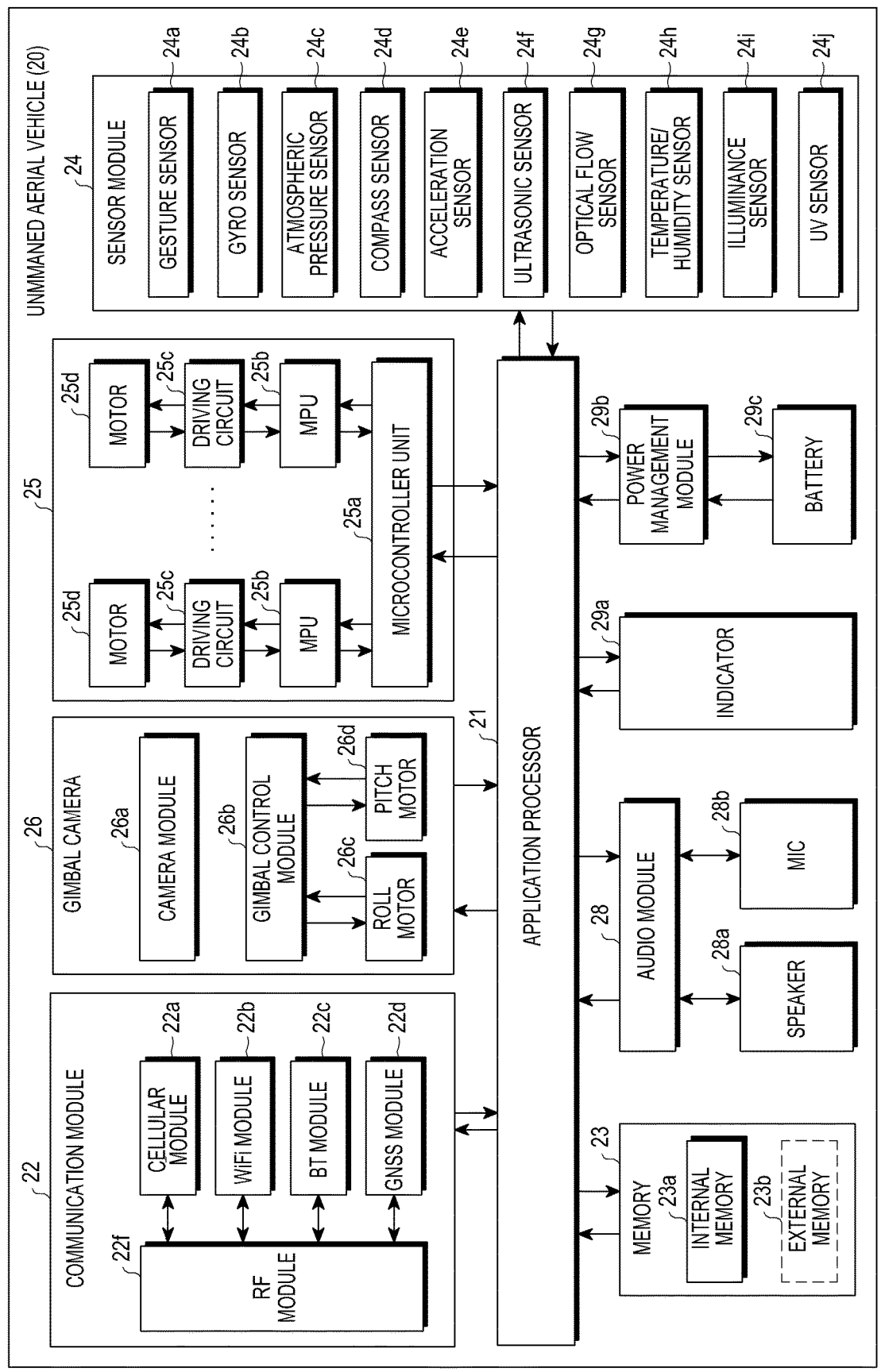
FIG. 7 is a block diagram illustrating a UAV according to an embodiment of the present disclosure.

FIG. 7 is a block diagram illustrating a UAV according to an embodiment of the present disclosure.

Referring to FIG. 7, the UAV 20 includes an application processor 21, a communication module 22, a memory 23, a sensor module 24, a thrust generating device 25, a gimbal camera 26, an audio module 28, an indicator 29a, a power management module 29b, and a battery 29c.

The application processor 21 may drive, for example, an operating system or an application program, e.g., as a part of the application platform 11 of FIG. 6, to control a plurality of hardware or software components connected thereto, and may also perform various data processing and arithmetic operations. The application processor 21 may be implemented by a System-on-Chip (SoC). The application processor 21 may further include a Graphic Processing Unit (GPU) and/or an image signal processor. The application processor 21 may include at least some of the other components illustrated in FIG. 7 (e.g., a cellular module 22a).

The application processor 21 may load a command or data received from at least one of the other components (e.g., a non-volatile memory) in a volatile memory to process the command and data, and may store result data in a non-volatile memory. The application processor 21 may control the thrust generating device 25 and/or the gimbal camera 26 according to a program stored in the communication module 22 and/or the memory 23.

The communication module 22 includes the cellular module 22a, a WiFi module 22b, a Bluetooth module 22c, a global navigation satellite system (GNSS) module 22d, and a radio frequency (RF) module 22f. The cellular module 22a may provide a voice call, a video call, a message service, or an internet service through, e.g., a communication network. The cellular module 22a may perform at least some of the functions that may be provided by the application processor 21. The cellular module 22a may include a Communication Processor (CP).

At least two of the cellular module 22a, the WiFi module 22b, the Bluetooth module 22c, and the GNSS module 22d may be incorporated in a single Integrated Chip (IC) or IC package.

The RF module 22f may transmit/receive a communication signal (e.g., an RF signal). The RF module 22f may include a transceiver, a power amp module (PAM), a frequency filter, a low noise amplifier (LNA), an antenna, etc.

At least one of the cellular module 22a, the WiFi module 22b, the Bluetooth module 22c, and the GNSS module 22d may transmit/receive an RF signal through at least one separate RF module.

The memory 23 includes an internal memory 23a and an external memory 23b. The internal memory 23a may include at least one of a volatile memory (e.g., a dynamic random-access memory (DRAM), a static RAM (SRAM), or a synchronous DRAM (SDRAM)), a non-volatile memory (e.g., an one time programmable read only memory (OTPROM), a PROM, an erasable PROM (EPROM), an electrically erasable PROM (EEPROM), a mask ROM, a flash ROM, a flash memory, a hard drive, and a solid state drive (SSD). The external memory 23b may include a flash drive (e.g., a compact flash (CF), a secure digital (SD), a micro SD (Micro-SD), a mini SD (Mini-SD), an extreme digital (xD), a multi-media card (MMC), or a memory stick). The external memory 23b may be functionally or physically connected to the UAV 20 through various interfaces.

The sensor module 24 may constitute at least a portion of the sensor module 113 of FIG. 1. The sensor module 24 may measure a physical quantity or may sense an operating status of the UAV 20, and may then convert the measured or sensed information into electric signals. The physical amount or the like detected through the sensor module 24 may be utilized as information required for the flight control of the UAV 20.

The sensor module 24 includes a gesture sensor 24a, a gyro sensor 24b, an atmospheric pressure sensor 24c, a compass sensor 24d, an acceleration sensor 24e, an ultrasonic sensor 24f, an optical flow sensor 24g, a temperature/humidity sensor 24h, an illuminance sensor 24i, and an ultraviolet (UV) sensor 24j. Additionally or alternatively, the sensor module 24 may include a control circuit for controlling one or more sensors incorporated therein. The UAV 20 may include a processor configured to control the sensor module 24 as a part of the application processor 21 or separately from the application processor 21 so as to control the sensor module 24 while the application processor 21 is in the sleep state. The sensor module 24 may measure a physical amount or may sense an operation state of the UAV 20 to provide the measured or sensed information to the thrust generating device 25, which may control the flight of the UAV 20 based on the provided information. For example, each of the sensor module 24 and the thrust generating device 25 may at least partially constitute the flight platform 13 of FIG. 6.

The thrust generating device 25 includes a microcontroller unit 25a, a plurality of microprocessor units (MPUs) 25b, a plurality of driving circuits 25c, and a plurality of motors 25d. The microcontroller unit 25a may generate a signal for controlling the motors 25d based on a control signal provided from the application processor 21 and various data provided through the sensor module 24. The MPUs 25b and the driving circuits 25c may drive the motors 25d (e.g., rotate the propellers 143 of FIG. 1) according to a control signal of the micron controller units 25a in order to generate the thrust and/or lift required for the flight of the UAV 20.

The gimbal camera 26 includes a camera module 26a, a gimbal control module 26b, a roll motor 26c and a pitch motor 26d. The camera module 26a is a device for photographing a still image and/or a video image. The camera module 26a may include at least one image sensor, a lens, an image signal processor (ISP), or a flash (e.g., a light emitting diode (LED) or a xenon lamp). When the UAV 20 rocks under the influence of the vibration of the thrust generating devices 25, surrounding air flows, etc., the gimbal control module 26b allows the camera 26a to capture a steady image while maintaining a predetermined posture or orientation. For example, the gimbal control module 26b can suppress the camera module 26a from being rocked with respect to a subject by driving the roll motor 26c and/or the pitch motor 26d to vibrate the camera module 26a in response to the vibration of the UAV 20, thereby improving the quality of a captured image.

The audio module 28 may bi-directionally convert sound and electric signals. The audio module 28 may process sound information input or output through a speaker 28a or a microphone 28b.

The indicator 29a may indicate a specific status (e.g., a booting status or a charged status) of the UAV 20 or of a part thereof (e.g., the application processor 21).

The power management module 29b may manage the electric power of the UAV 20. The power management module 29a may include a power management IC (PMIC), a charger IC, or a battery and/or fuel gauge. The PMIC may be configured as a wired and/or wireless charge type. The wireless charging type may include a magnetic resonance type, a magnetic induction type, or an electromagnetic wave type, and may further include an additional circuit for wireless charging (e.g., a coil loop, a resonance circuit, or a rectifier). The battery and/or fuel gauge may measure remaining fuel, e.g., for powering the motors 25*d*, the residual capacity of the battery 29*c*, and a voltage, a current, or a temperature during the charge. The battery 29*c* may include a rechargeable battery and/or a solar battery.

Figure 8:
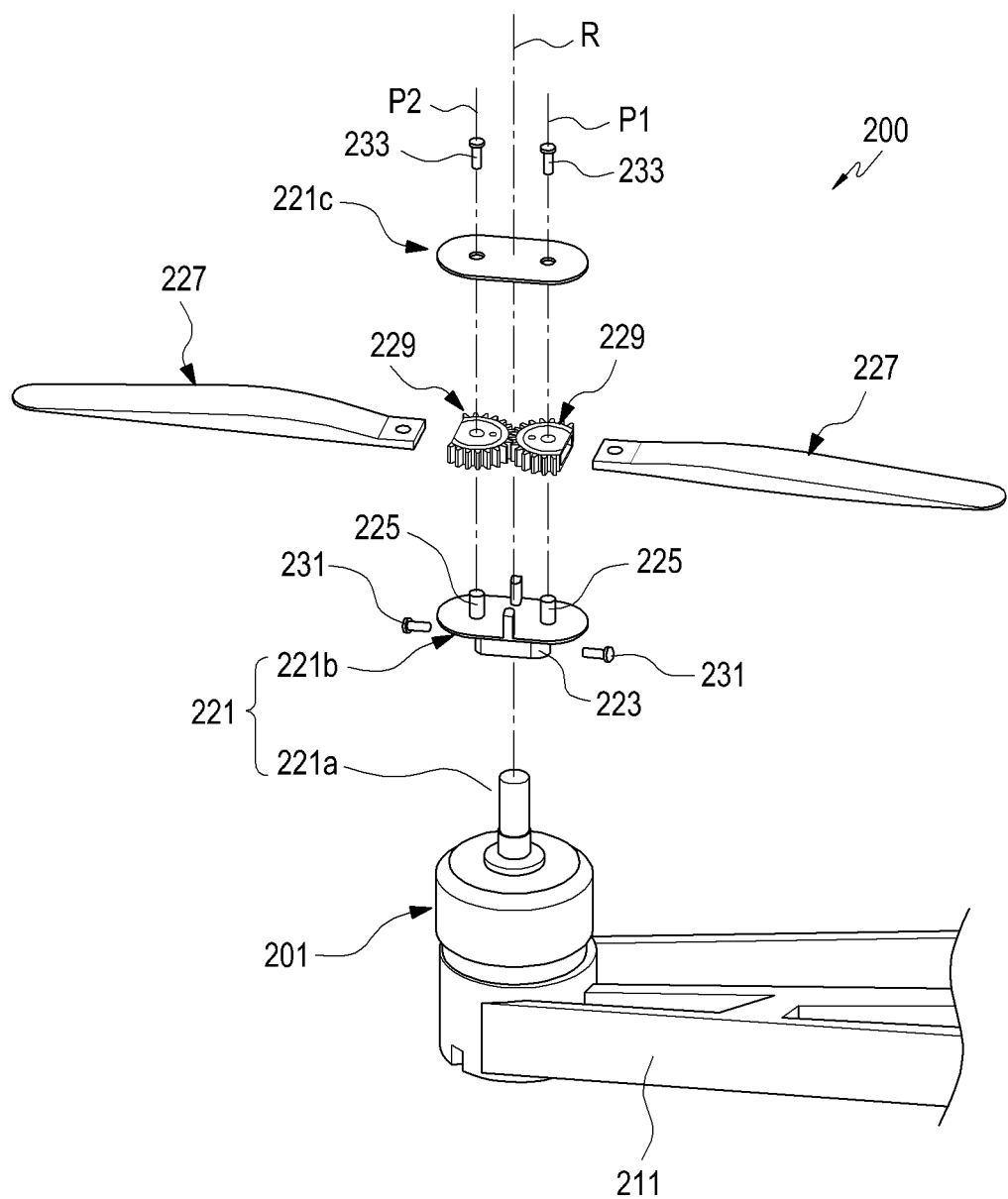
FIG. 8 is an exploded perspective view illustrating a thrust generating device of a UAV according to an embodiment of the present disclosure.
Figure 9:
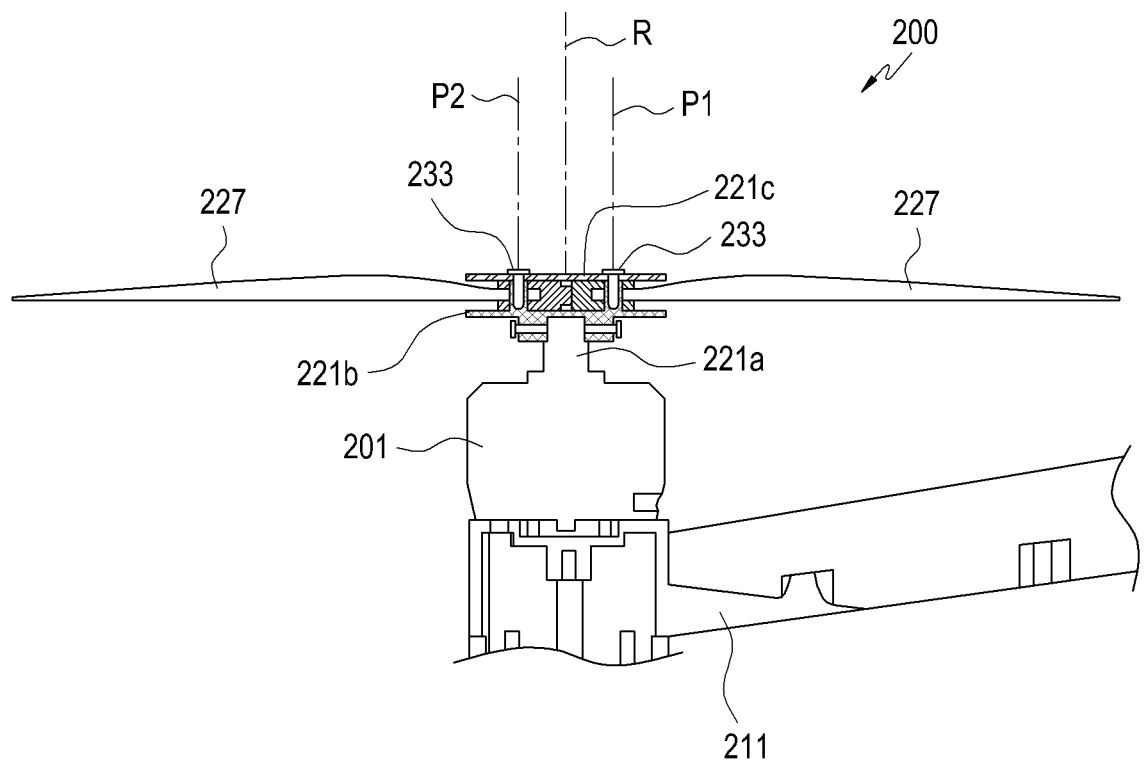
FIG. 9 is a sectional side view illustrating the thrust generating device of FIG. 8.

FIG. 8 is an exploded perspective view illustrating a thrust generating device of a UAV according to an embodiment of the present disclosure, and FIG. 9 is a side sectional view illustrating the thrust generating device of FIG. 8.

Referring to FIGS. 8 and 9, the thrust generating device 200 includes a driving motor 201 mounted on a frame 211, and a propeller mounted on the driving motor 201. The propeller includes a hub 221 and blades 227 mounted on the hub 221. The blades 227 are pivotably interlocked with each other by gears 229 to be folded parallel to each other at one side thereof in a first arrangement or to be expanded to diametrically (or radially) aligned positions of the rotating region (rotating plane) of the propeller in a second arrangement.

The driving motor 201 may be driven by receiving power and a control signal from, e.g., the microcontroller unit 25*a* of FIG. 7, to rotate the hub 221.

The hub 221 includes a rotary shaft 221*a*, a first cover unit 221*b*, and a second cover unit 221*c*. The rotary shaft 221*a* extends from the driving motor 201, which may provide a rotation axis R of the propeller by being rotated by the driving motor 201. The first cover unit 221*b* may be mounted on a portion (e.g., an end portion) of the rotary shaft 221*a* to be rotated about the rotation axis R by the rotary shaft 221*a*. On the bottom surface of the first cover unit 221*b*, a mounting protrusion 223 may be formed to be coupled to a portion (e.g., the end portion) of the rotary shaft 221*a*. The hub 221 includes first screws 231, which fasten to the mounting protrusion 223 to be in close contact with the outer peripheral surface of the rotary shaft 221*a* or to be bounded to the rotary shaft 221*a*. For example, the first screws 231 may mount and fix the first cover unit 221*b* to the rotary shaft 221*a*. The second cover unit 221*c* may be mounted and fixed to the first cover unit 221*b* when facing the first cover unit 221*b*. The hub 221 further includes bosses 225, each of which extends from one face of the first cover unit 221*b*. The bosses 225 may be respectively located at positions that are spaced apart from the rotation axis R, and may support one face of the second cover unit 221*c* to constantly maintain the gap between the first cover unit 221*b* and the second cover unit 221*c*. The bosses 225 may extend from the one face of the first cover unit 221*b* to be parallel with the rotation axis R. The hub 221 further includes second screws 233, which may be fastened to the bosses 225 through the second cover unit 221*c*. For example, the second cover unit 221*c* may be mounted and fixed to the upper ends of the bosses 225 by the second screws 233. The bosses 225 may be formed on a selected one or each of the first cover unit 221*b* and the second cover unit 221*c*, and the number of screws (e.g., the second screws 233) provided to bind and fix the first cover unit 221*b* and the second cover unit 221*c* to each other may correspond to the number of the bosses 225.

At least some of the bosses 225 may be provided for rotatably (or pivotally) mounting the blades 227 on the hub 221. For example, one end of each of the blades 227 may be pivotally bound to one of the bosses 225. In pivotally mounting the blades 227 on the hub 221, when one of the blades 227 is pivoted in a first direction with respect to the hub 221, the other blade may be pivoted to a direction opposite to the first direction such that the blades may be pivoted toward or away from each other. When one of the blades 227 is pivoted clockwise, the other is pivoted counterclockwise such that the blades are aligned to be parallel with each other at one side thereof, or may be aligned to the positions expanded to each other (i.e., the positions where the blades 227 are substantially in line with each other).

The description "the blades 227 are aligned to the positions where the blades are substantially in line with each other" may indicate that the propeller includes a pair of blades, 1) the blades 227 are respectively aligned to the positions where the diameter of the rotating region (rotating plane) of the propeller is the maximum, and/or 2) in the rotating region (rotating plane) (e.g., a circle) of the propeller, which is centered on the rotation axis R, each of the blades 227 is aligned to the diametric direction (or the radial direction) of the rotating region (rotating plane). However, the present disclosure is not needed to be limited thereto. For example, the propeller of the UAV may include three (3) blades. In this case, among the blades, at least a pair of blades are interlocked with each other such that the blades may be expanded in the positions (e.g., the second arrangement) where the diameter of the rotating region (rotating plane) of the propeller is maximized or the pair of blades are aligned in the diametric direction (or in the radial direction) of the rotating region (rotating plane) of the propeller. Because the blades 227 are pivotably interlocked with each other within the hub 221, the drag acting on each of the blades 227 may be offset when the propeller is rotated.

In order to mount the blades 227 on the hub 221 to be pivotable and/or to be interlocked with each other, the propeller further includes gears 229. The gears 229 may have a sun gear structure, and the teeth of the gears 229 may be engaged with each other in a state where each of the gears 229 may be rotatably coupled to one of the bosses 225. For example, the gears 229 may be mounted on the hub 221 to be rotated in the opposite directions while being interlocked with each other. Because one end of each of the blades 227 is mounted on one of the gears 229, the blades 227 are interlocked to be pivotable with respect to the hub 221. The respective pivot axes P1 and P2 of the blades 227 may be arranged to be parallel with the rotation axis R and to be symmetrical to each other with reference to the rotation axis R.

When the propeller is rotated counterclockwise, the drag acting on each of the blades 227 may act as a force of pivoting each of the blades 227 clockwise with respect to the hub 221. However, because the blades 227 are interlocked with each other through the gears 229, and the gears 229 are rotatable only in the opposite directions in relation to each other, the drags acting on the respective blades 227 may be offset to each other. For example, because the blades 227 are interlocked with each other, the drags acting on the respective blades 227 when the propeller is rotated are offset to each other, and the blades 227 may be maintained in the state of being aligned to the positions where the diameter of the rotating region (rotating plane) of the propeller is the longest.

Figure 10:
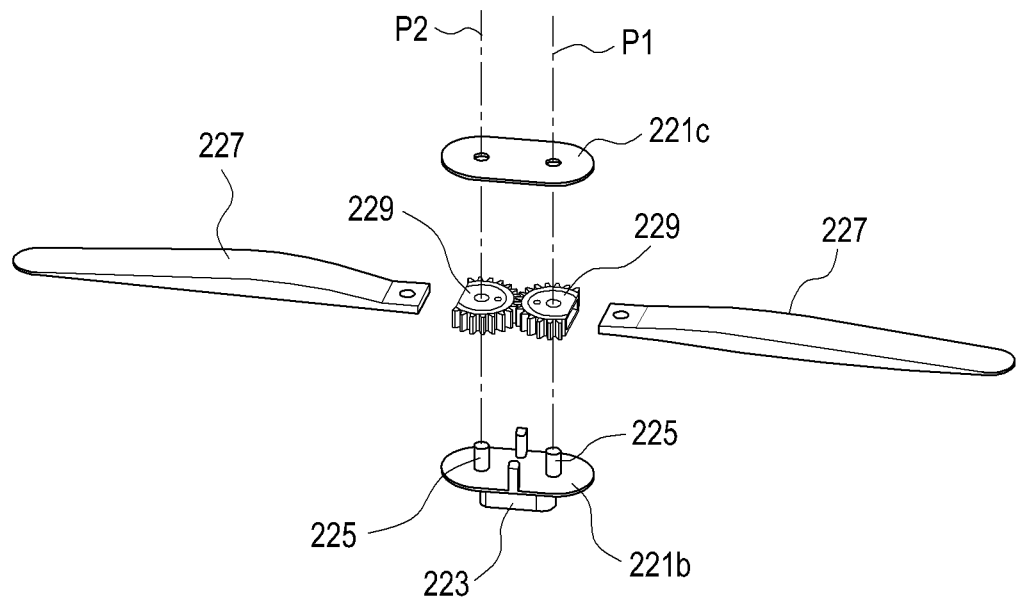
FIG. 10 is an exploded perspective view illustrating a propeller of the UAV according to an embodiment of the present disclosure.
Figure 11:
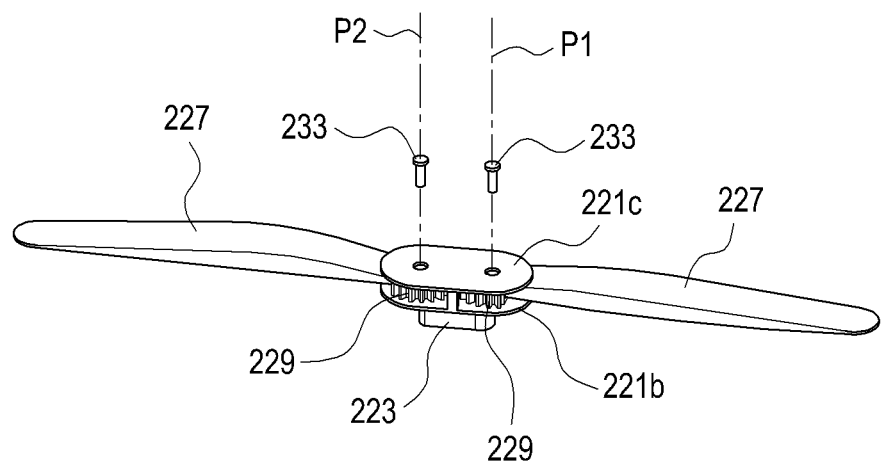
FIG. 11 is a perspective view illustrating assembly of the propeller of FIG. 10.

FIG. 10 is an exploded perspective view illustrating a propeller of a UAV according to an embodiment of the present disclosure. FIG. 11 is a perspective view illustrating assembly of the propeller of FIG. 10, and FIG. 12 is a perspective view illustrating assembly of a blade to a gear for the UAV according to an embodiment of the present disclosure.

Figure 12:
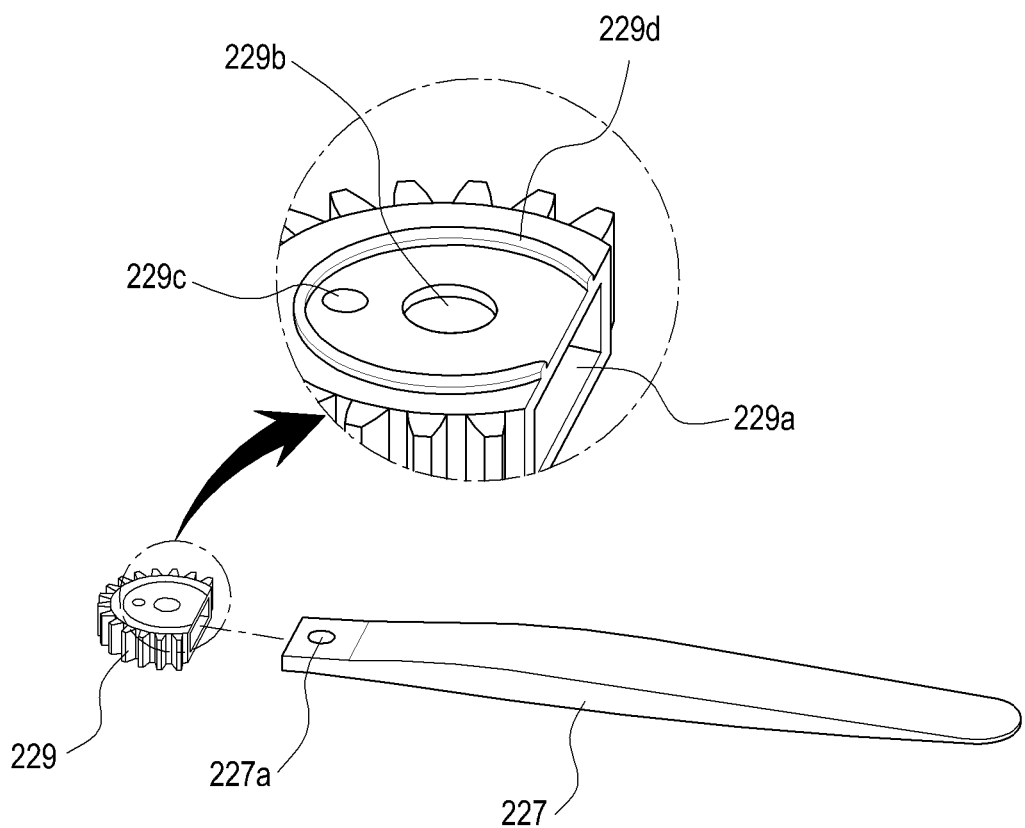
FIG. 12 is a perspective view illustrating assembly of a blade to a gear for the UAV according to an embodiment of the present disclosure.

Referring to FIGS. 10 to 12, the gears 229 include a mounting hole 229*a*, a rotation hole 229*b*, an alignment indication 229*c*, and a guide portion 229*d*. The mounting hole 229a may extend from a side surface of each of the gears 229 in a direction that is perpendicular to the rotation axis R and/or the pivot axes P1 and P2. Because one end of each blade 227 is mounted by being inserted into the mounting hole 229a, the blades 227 are capable of being pivoted with respect to the hub 221 about the gears 229, respectively. The gears 229 may be formed of the same material as the blades 227 in a single body (integrally) with the blades 227, respectively. Although FIGS. 10 to 12 illustrate a gear 229 and a blade 227 as separate components, the present disclosure is not limited thereto. The gear 229 and the blade 227 may be manufactured in the form of a single component.

The rotation hole 229b may be formed to pass through the opposite surfaces each of the gears 229 along the direction of each of rotation axes (e.g., the pivot axes P1 and P2 of the blades). Each of the gears 229 may be rotatably coupled to one of the bosses 225 through the rotation hole 229b. When each of the bosses 225 is coupled to the rotation hole 229b, a portion of each of the bosses 225 may be positioned within the mounting hole 229a. One end of each blade 227 may be formed with a fixing hole 227a so that when the blade 227 is coupled to the corresponding gear 229, the fixing hole 227a may be aligned with the rotation hole 229b of the gear 229. For example, the boss 225 may be rotatably (pivotally) coupled to the gear 225 and/or the blade 227 through the rotation hole 229b and the fixing hole 227a.

When the gear 229 and/or the blade 227 are coupled to the boss 225, the second cover unit 221c may be fixedly mounted on the boss 225 by one or more second screws 233. For example, when the second cover unit 221c is coupled, the blades 227 and/or the gears 229 may be pivotally (rotatably) coupled to the hub 221, and may be restrained not to be separated from the hub 221.

When each of the gears 229 is coupled to the boss 225, the teeth of the gears 229 are engaged with each other so that the blades 227 can be interlocked with each other. For example, when a user pivots one of the blades such that the blade is positioned at one side of the other blade, the other blade may be pivoted toward the blade pivoted by the user. When the propeller is rotated, a centrifugal force may act on each of the blades 227, and the blades 227 may be pivoted away from each other (e.g., to a position where each of the blades 227 is aligned in a diametric direction (or a radial direction) of the rotating region (rotating plane) of the propeller). When the propeller is rotated such that the blades 227 are aligned in the diametric direction (or the radial direction) of each propeller rotating region (rotating plane), the drags acting on respective blades 227 may be offset by the gears 229. For example, even if the propeller is rotated, each of the blades 227 can stably maintain the state aligned in the diametric direction (or the radial direction) of the propeller rotating region (rotating plane).

The alignment indication 229c may be provided in order to allow the user (or a technician who assembles the propeller) to readily recognize the positional relationship between the blades 227. Even with the same rotation, the thrust generating efficiency of the propeller may vary unless the blades 227 are aligned to a proper position. For example, although the propeller has been designed based on the state of being aligned in the diametric direction (or the radial direction) of the propeller rotating region (rotating plane), the propeller may not generate a thrust to correspond to the designed efficiency when an error occurred in the relative angular position of the blades 227 in the process of assembly. The alignment indication 229c may provide visual information such that the technician can readily recognize the relative assembly positions or the like of the blades 227 and/or the gears 229.

The guide portion 229d may be formed on at least one surface of the gear 229 (e.g., the surface facing the first cover unit 221b or the second cover unit 221c). The guide portion 229d may include one or more protrusions protruding from at least one surface of the gear 229, and may be in point contact with the first cover unit 221b or the second cover unit 221c. For example, the guide portion 229d may reduce the contact area between the gear 229 and the first cover unit 221b (or the second cover unit 221c) so as to reduce the frictional force generated when the gear 229 is rotated with respect to the hub 221. The guide portion 229d may have a circular arc shape that extends along the circumferential direction of the gear 229 while protruding from at least one surface of the gear 229. For example, the guide portion 229d may be in line contact between the gear 229 and the first cover unit 221b (or the second cover unit 221c) so as to reduce the frictional force generated when the gear 229 is rotated with respect to the hub 221. The alignment indication 229c may be provided by using the position and the shape of the guide portion 229d. For example, when the guide portion 229d is provided in the form of a protrusion at a position where it is desired to form the alignment indication 229c, it may have a shape (e.g., a triangular shape or an arrow shape) or a size that can be differentiated from those of other protrusions. When the guide portion 229d has a circular arc shape, a portion of the guide portion 229d may be removed so as to provide the function of the alignment indication 229c.

Figure 13:
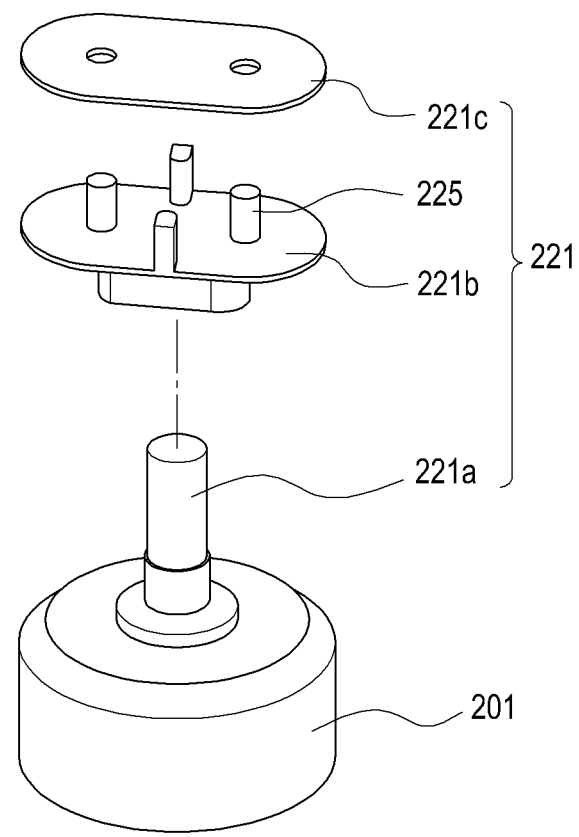
FIG. 13 is an exploded perspective view illustrating a propeller hub in a UAV according to an embodiment of the present disclosure.
Figure 14:
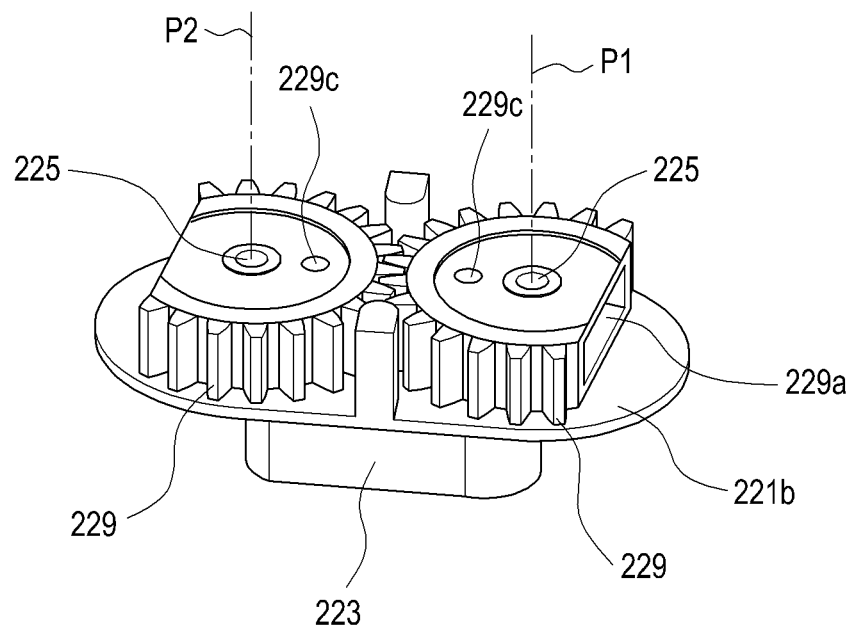
FIG. 14 is a perspective view illustrating assembly of a gear to a hub in a UAV according to an embodiment of the present disclosure.

FIG. 13 is an exploded perspective view illustrating a propeller hub in a UAV according to an embodiment of the present disclosure, and FIG. 14 is a perspective view illustrating gears are assembled to the hub of FIG. 13.

Further referring to FIGS. 13 and 14, when each of the gears 229 is coupled to the hub 221 (e.g., the first cover unit 221b), each of the bosses 225 may be inserted into the rotation hole (e.g., the rotation hole 229b in FIG. 14) of one of the gears. Each of the gears 229 may be rotatably coupled to the bosses 225 while the teeth of the gears 229 are engaged with each other. For example, the gears 229 may be coupled to the first cover unit 221b to be rotatable in the opposite directions in relation to each other. When the gears 229 are coupled, the ends of the bosses 225 may be exposed to the surfaces of the gears 229, respectively, and when the second cover unit 221c is disposed to face the surfaces of the gears 229, screws (e.g., the second screws 233 in FIG. 8) may be fastened to couple and fix the second cover unit 221c to a portion (e.g., the end) of each of the bosses 225. Because the guide portion (e.g., the guide portion 229d in FIG. 12) is in point contact or line contact with the first cover unit 221b and/or the second cover unit 221c, the gears 229 can be smoothly rotated between the first cover unit 221b and the second cover unit 221c.

Figure 15:
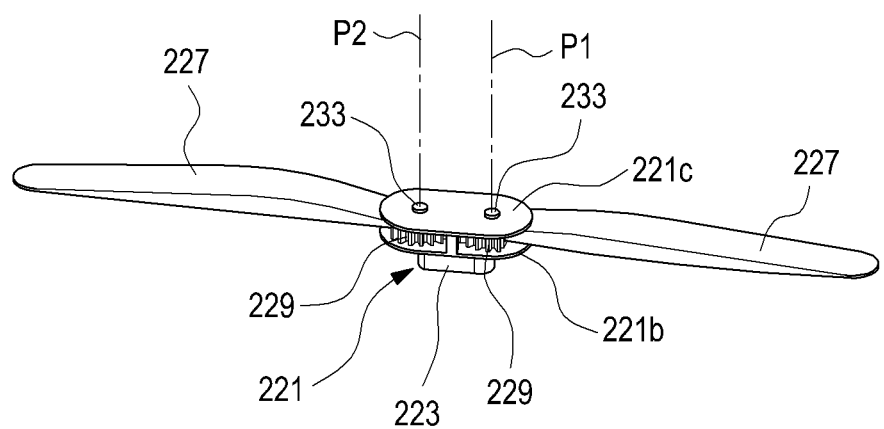
FIG. 15 is a perspective view illustrating a propeller of a UAV according to an embodiment of the present disclosure.
Figure 16:
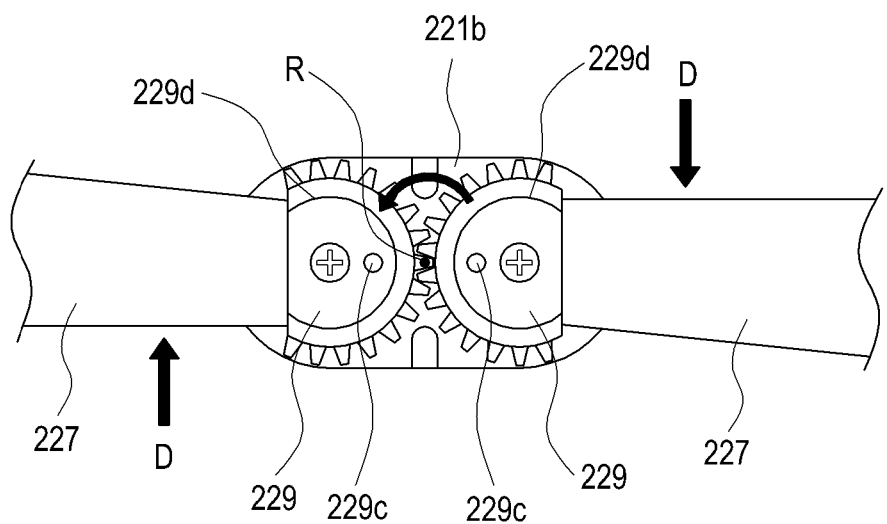
FIG. 16 illustrates an interlocking structure of blades in a UAV according to an embodiment of the present disclosure.

FIG. 15 is a perspective view illustrating a propeller of a UAV according to an embodiments of the present disclosure, and FIG. 16 is a view for describing an interlocking structure of blades of the propeller of FIG. 15.

Referring to FIGS. 15 and 16, when each of the blades 227 is aligned in the diametric direction (or the radial direction) in the rotating region (rotating plane) of the propeller (hereinafter, referred to as an "expanded state"), the alignment indications 229c are positioned to be adjacent to each other. The blades 227 may be interlocked with each other to be individually pivotable with respect to the hub 221 and/or the first cover unit 221b, and may be expanded by a centrifugal force when the propeller is rotated. In the expanded state, the blades 227 may be symmetrically positioned with reference to the propeller (and/or the first cover unit 221b) (e.g., positioned to maximize the diameter of the rotating region (rotating plane) of the propeller).

While the propeller is being rotated, the drag D, according to air resistance, may act on each of the blades 227. For example, in FIG. 16, when the propeller is rotated counterclockwise, the drag D may act as a force for pivoting the blades 227 clockwise with respect to the first cover unit 221b. The blades 227 may be interlocked with each other through the gears 229 are engaged with each other to be rotated in the opposite directions in relation to each other within the hub 221. For example, although each of the gears 229 is provided with the force of rotating clockwise by the drag D, the drags D acting on the respective blades 227 may be offset because the gears 229 are engaged with each other.

Because the centrifugal forces and the drags acting on the respective blades 227 while the propeller is being rotated are substantially the same as each other and the drags are offset, the blades 227 can be maintained in the state where they are expanded by the centrifugal forces of the blades 227 (e.g., the position where the diameter of the rotating region (rotating plane) of the propeller is maximized). For example, the UAV may generate a thrust (or a lift) by expanding the blades 227 by a centrifugal force while the propeller is being rotated, and the blades 227 are interlocked with each other to offset the drags that respectively act on the blades 227 such that the designed efficiency (thrust performance) can be easily exhibited.

Figure 17:
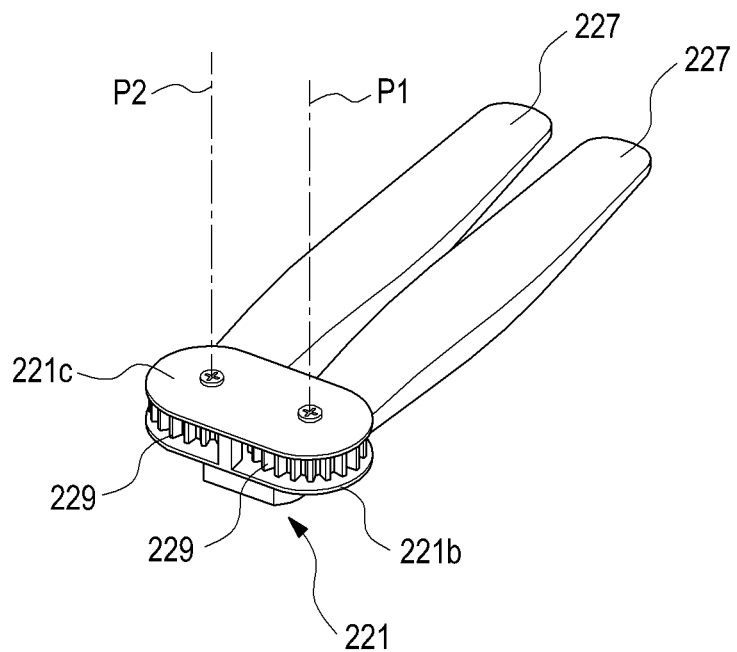
FIGS. 17 to 19 illustrate the blades of FIG. 16 being arranged in parallel with each other at one side thereof in a UAV according to an embodiment of the present disclosure.
Figure 18:
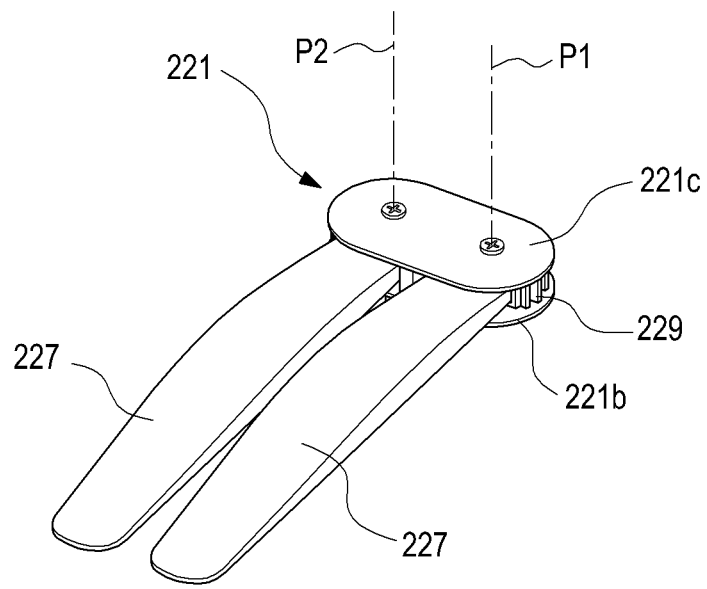
Figure 19:
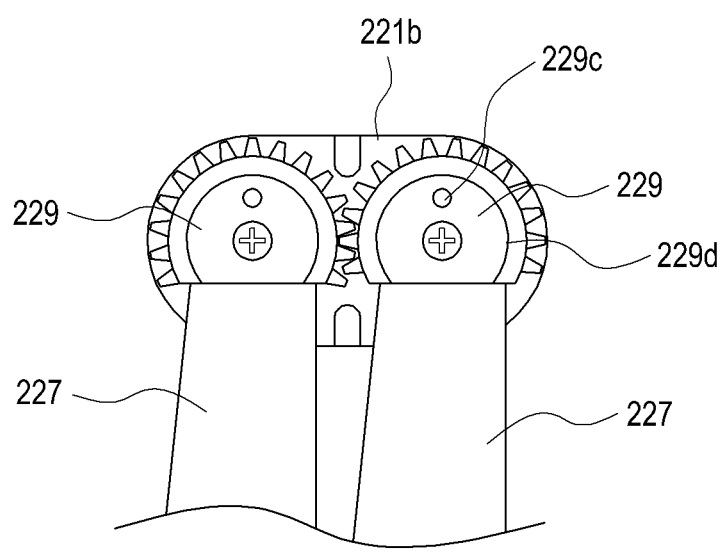

FIGS. 17 to 19 are views each illustrating blades arranged in parallel with each other at one side thereof in a UAV according to an embodiment of the present disclosure;

Referring to FIGS. 17 to 19, each of the blades 227 may be pivoted with respect to the hub 221 within the rotating region (rotating plane) of the propeller. For example, when the propeller is not rotated, the blades 227 may be positioned in parallel to each other at one side thereof. The pivot axes P1 and P2 of the blades 227 are formed to be in parallel with the rotation axis (e.g., the rotation axis R of FIG. 8) of the propeller (e.g., in the direction perpendicular to the rotating region (rotating plane) of the propeller) such that the blades 227 can be positioned within the rotating region (rotating plane) of the propeller even when the blades are positioned in parallel with each other at a side thereof (hereinafter, a "folded state"). The blades 227 may be positioned within the rotating region (rotating plane) of the propeller in the expanded or folded state, and in the folded state, the blades 227 may be positioned on the frame (e.g., the frame 102 in FIG. 1) of the UAV. When moved or stored, the blades 227 may be positioned on another structure of the UAV, which enables the space occupied by the UAV to be reduced.

Figure 20:
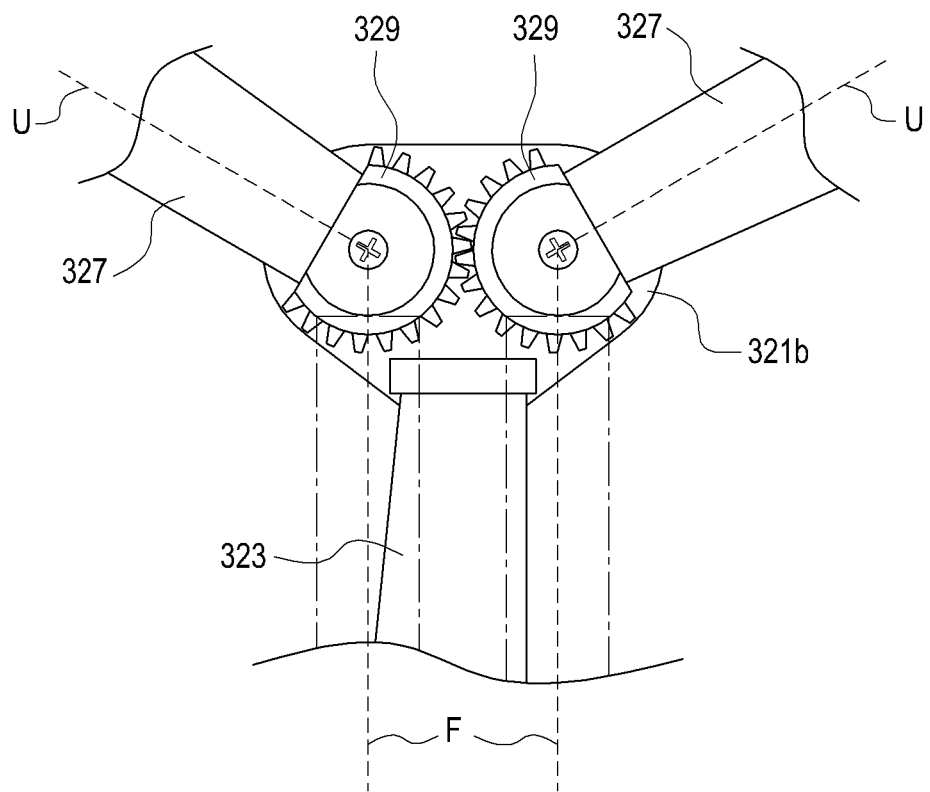
FIG. 20 illustrates a modification of a propeller in a UAV according to an embodiment of the present disclosure.

FIG. 20 is a view illustrating a modification of a propeller in a UAV according to an embodiment of the present disclosure.

Referring to FIG. 20, the UAV (e.g., the propeller) includes a stationary blade 323 fixed to the hub (e.g., the first cover unit 321b) and moveable blades 327, each of which is pivotally coupled to the first cover unit 321b. The stationary blade 323 may extend in one direction (e.g., a direction perpendicular to the rotation axis of the propeller) where one end thereof is fixed to the first cover unit 321b. One end of each of the blades 327 is provided with a gear 329, and the blades 327 may be pivotably coupled to the first cover unit 321b where the gears 329 are engaged with each other to be rotatable. For example, the blades 327 may be individually coupled to the first cover unit 321b, and may be interlocked with each other by the gears 329 to be pivoted in the opposite directions in relation to each other.

The blades 327 may be pivoted from a position F where the blades 327 are aligned to be parallel with each other at one side of the stationary blade 323 (hereinafter, a "folded position") to a position U where the blades are pivoted in the opposite directions to be expanded by a predetermined angular interval in relation to each other (hereinafter, an "expanded position"). At the expanded position U, the stationary blade 323 and the blades 327 may be arranged to form an angular interval of 120 degrees. At the expanded position U, when the central lines of the stationary blade 323 and the blades 327 extend, an intersection point thereof may be formed on the rotation axis of the propeller. At the expanded position U, the blades 327 may be aligned in the diameter direction (or the radius direction) of the rotating region (rotating plane) of the propeller. For example, when the propeller is rotated, a centrifugal force and a drag may act on each of the blades 327. Drags may be offset by the gears 329, and the blades 327 may be aligned in the diameter direction (or the radius direction) of the rotating region (rotating plane) by the centrifugal force. The blades 327 may be pivoted with respect to the first cover unit 321b within the rotating region (rotating plane) of the propeller. For example, in the position F in which the blades 327 are aligned to be parallel with the stationary blade 323, the blades 327 may be positioned on the frame of the UAV together with the stationary blade 323, which enables the UAV to be readily moved and stored.

Figure 21:
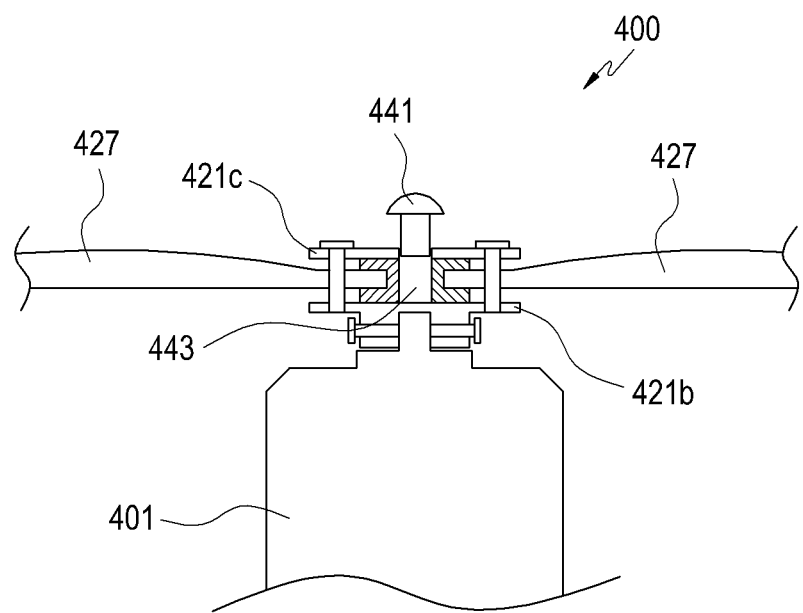
FIG. 21 illustrates a configuration of a modification of a thrust generating device in a UAV according to an embodiment of the present disclosure.
Figure 22:
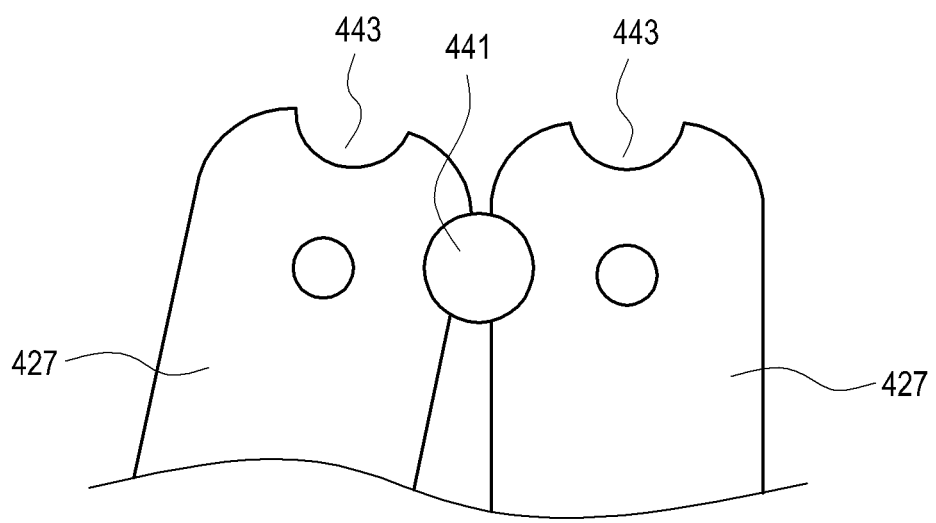
FIG. 22 illustrates the blades of the thrust generating device of FIG. 21 folded in the UAV according to an embodiment of the present disclosure.
Figure 23:
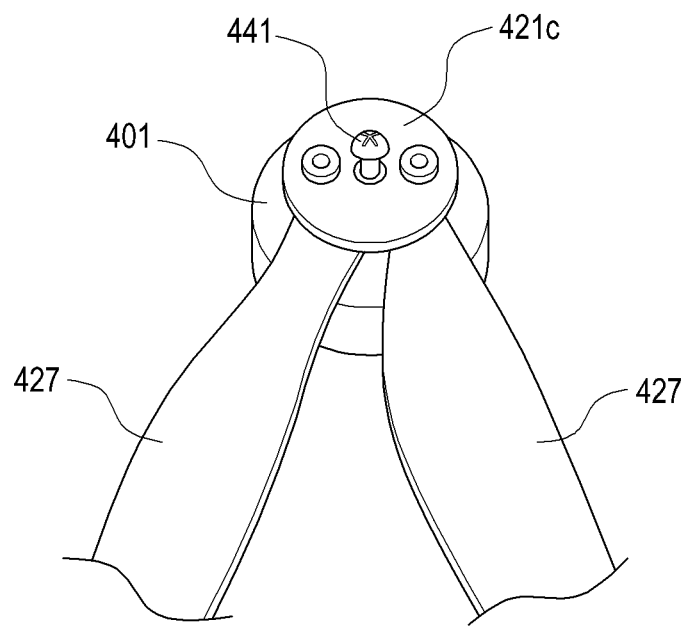
FIG. 23 is a perspective view illustrating the blades of the thrust generating device of FIG. 21 folded in the UAV according to an embodiment of the present disclosure.

FIG. 21 illustrates a modification of a thrust generating device in a UAV according to an embodiment of the present disclosure. FIG. 22 illustrates the blades of the thrust generating device of FIG. 21 folded in the UAV, and FIG. 23 is a perspective view illustrating the blades of the thrust generating device of FIG. 21 folded in the UAV.

Figure 24:
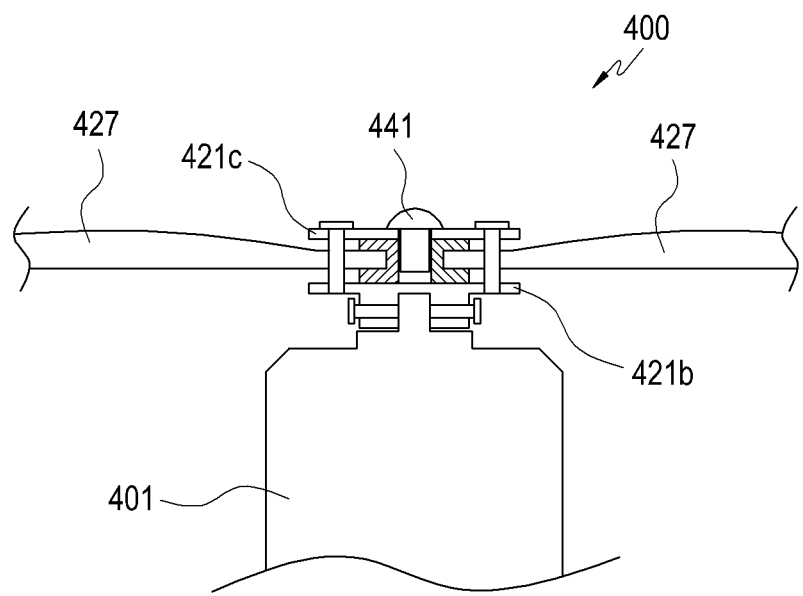
FIG. 24 illustrates another modification of a thrust generating device in a UAV according to an embodiment of the present disclosure.
Figure 25:
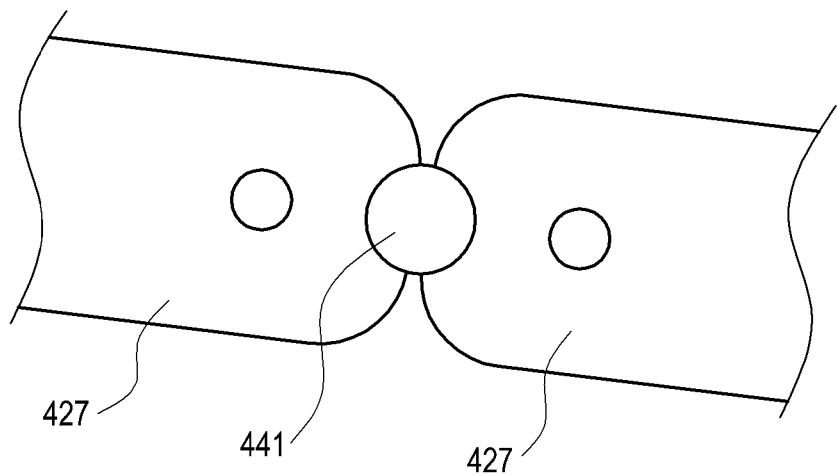
FIG. 25 illustrates the blades of the thrust generating device of FIG. 24 expanded in the UAV according to an embodiment of the present disclosure.
Figure 26:
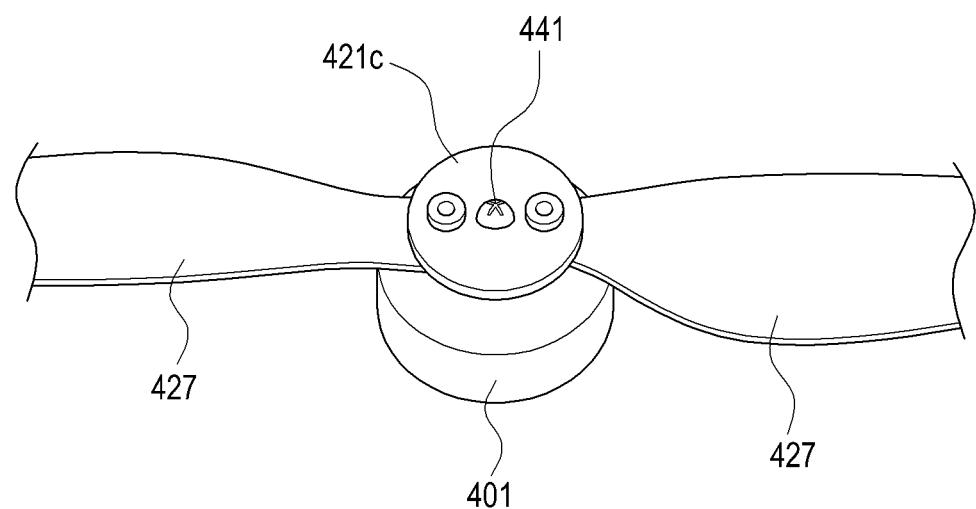
FIG. 26 is a perspective view illustrating the blades of the thrust generating device of FIG. 24 expanded in the UAV according to an embodiment of the present disclosure.

FIG. 24 illustrates another modification of a thrust generating device in a UAV according to an embodiment of the present disclosure. FIG. 25 illustrates the blades of the thrust generating device of FIG. 24 expanded in the UAV, and FIG. 26 is a perspective view illustrating the blades of the thrust generating device of FIG. 24 expanded in the UAV.

Referring to FIGS. 21 to 26, the UAV and/or the thrust generating device (e.g., the propeller) 400 further includes a stopper 441 mounted on the hub (e.g., the second cover unit 421c) and a stopper recess 443 formed on each of the blades 427. The blades 427 may be pivotally coupled between the first cover unit 421b and the second cover unit 421c. The blades 427 may be positioned to be parallel with each other at one side thereof by being pivoted with respect to the first cover unit 421b and/or the second cover unit 421c, or may be expanded to the position aligned in the diametrical direction of the rotating region (rotating plane) of the propeller according to the operation of the driving motor 401. Although not specifically illustrated, the gears (e.g., the gear 229 in FIG. 8) is formed at one end of each blade 427 such that the pivotal movements of the blades 427 with respect to the first cover unit 421b and/or the second cover unit 421c can be interlocked with each other.

The stopper 441 may be mounted on the second cover unit 421c to be progressed/retreated in the direction of the rotation axis of the propeller. For example, the stopper 441 may be mounted on the second cover unit 421c to be progressed/retreated so that the stopper 441 may protrude to the outside of the second cover unit 421c, or so that a portion of the end of the stopper 441 may be exposed to the outside of the second cover unit 421c while generally maintaining the state of being introduced between the first cover unit 421b and the second cover unit 421c. The thrust generating device 400 may include a spring to provide an elastic force acting in the direction of causing the stopper 441 to be introduced between the first cover unit 421b and the second cover unit 421c.

Referring to FIGS. 21 to 23, when the stopper 441 is disengaged from the stopper recess 443 while being progressed/retreated, the blades 427 are pivotable with respect to the first cover unit 421b and/or the second cover unit 421c. When the stopper 441 is disengaged from the stopper recess 443 while the rotation of the propeller is stopped, the blades 427 may be pivoted with respect to the first cover unit 421b and/or the second cover unit 421c to be aligned to be parallel with each other at one side thereof. When the blades 427 are aligned to be parallel with each other at one side thereof, the stopper 441 interferes with at least one of the blades 427 such that the stopper 441 can maintain the state of protruding to the outside of the second cover unit 421c, rather than being completely introduced between the first cover unit 421b and the second cover unit 421c. The blades 427 can be aligned to be parallel with each other at one side thereof by being pivoted with respect to the first cover unit 421b and/or the second cover unit 421c within the rotating region (rotating plane) of the propeller. When the blades 427 are aligned to be parallel with each other at one side thereof, the blades 427 may be positioned on another structure (e.g., the frame 102 in FIG. 1) of the UAV. For example, when the blades 427 are positioned on the other structure of the UAV, the space occupied by the UAV is reduced, which may facilitate the movement or storage of the UAV.

Referring to FIGS. 24 to 26, when the blades 427 are expanded, the stopper recess 443 may be aligned to the position that corresponds to the stopper 441. For example, when the blades 427 are aligned in the diametric direction of the rotating region (rotating plane) of the propeller, the stopper 441 may be engaged in the stopper recess 443. When the stopper 441 is engaged in the stopper recess 443, the blades 427 may be fixed, rather than being pivoted with respect to the hub, for example, the first cover unit 421b and/or the second cover unit 421c. By being fixed not to be pivoted with respect to the first cover unit 421b and/or the second cover unit 421c, even if a drag is generated as the propeller is rotated, the blades 427 may exhibit a stable thrust performance while maintaining the blades 427 being aligned in the diametric direction of the rotating region (rotating plane) of the propeller.

Figure 27:
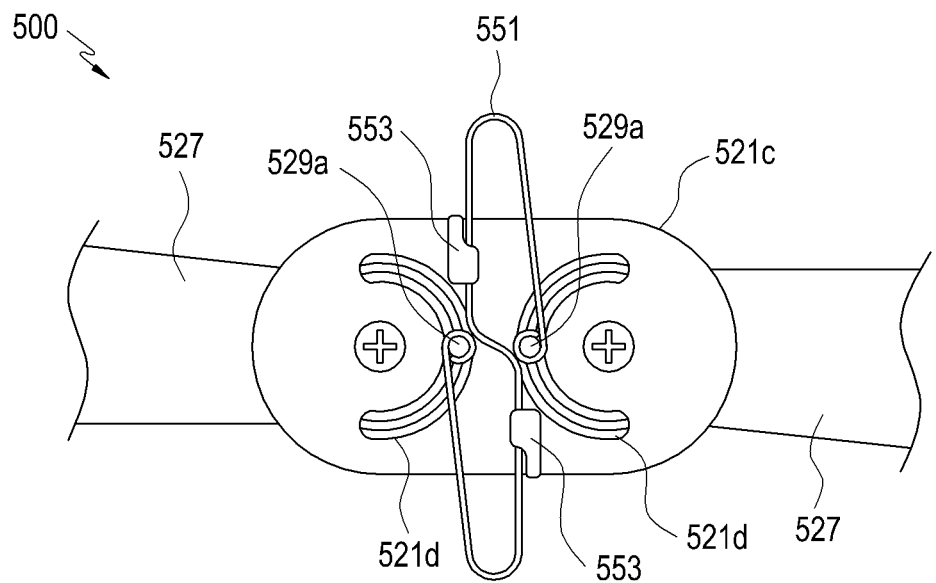
FIG. 27 illustrates another modification of a thrust generating device in a UAV according to an embodiment of the present disclosure.
Figure 28:
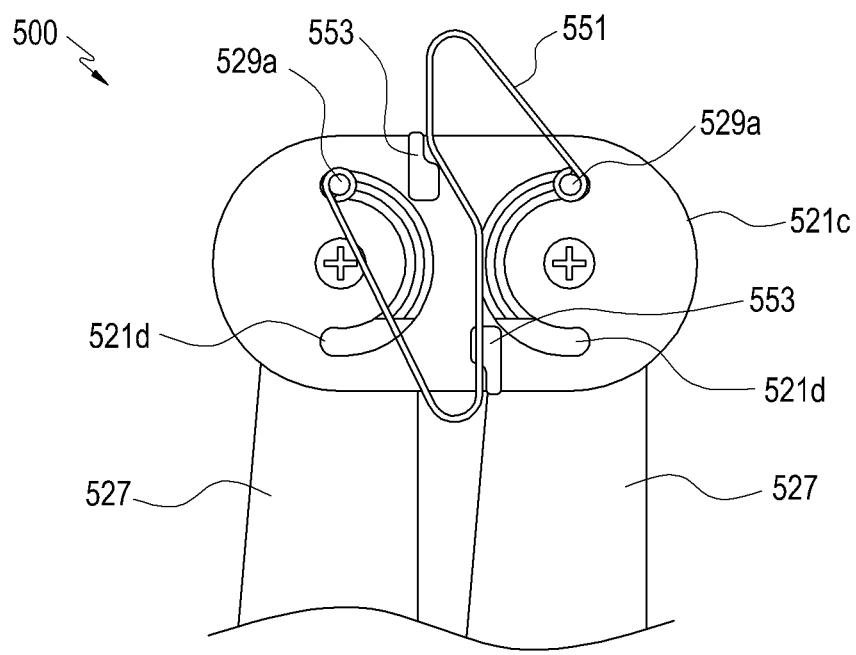
FIG. 28 illustrates the blades of the thrust generating device of FIG. 27 folded in the UAV according to an embodiment of the present disclosure.

FIG. 27 illustrates another modification of a thrust generating device in a UAV according to various embodiments of the present disclosure. FIG. 28 illustrates the blades of the thrust generating device of FIG. 27 folded in the UAV.

Figure 29:
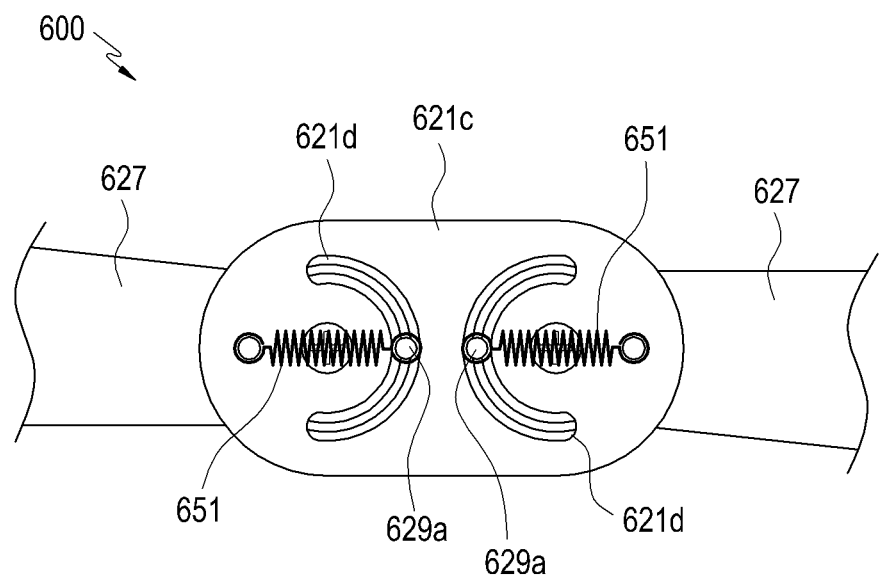
FIG. 29 illustrates another modification of a thrust generating device in a UAV according to an embodiment of the present disclosure.
Figure 30:
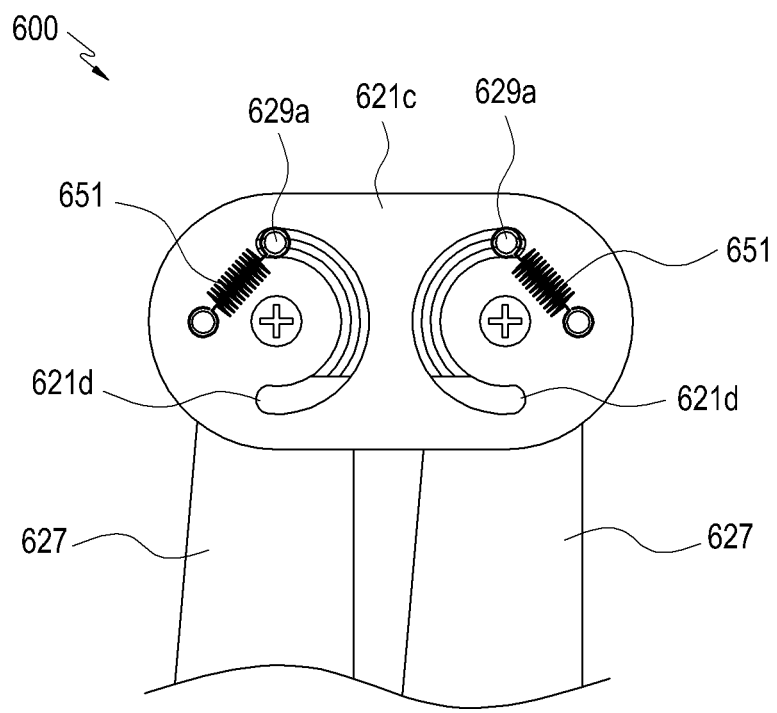
FIG. 30 illustrates the blades of the thrust generating device of FIG. 29 folded in the UAV according to an embodiment of the present disclosure.

FIG. 29 illustrates another modification of a thrust generating device in a UAV according to an embodiment of the present disclosure. FIG. 30 illustrates the blades of the thrust generating device of FIG. 29 folded in the UAV.

Referring to FIGS. 27 to 30, the thrust generating devices 500 and 600 further include elastic members 551 and 651, respectively. As one portion of the elastic member 551 or 651 is supported on the hub (e.g., the second cover unit 521c or 621c) and the other portion is supported on support protrusions 529a or 629a formed on the gear and/or the blades 527 or 627, the elastic member 551 or 651 is capable of providing an elastic force that acts in the direction of aligning the blades 527 or 627 to be parallel with each other at one side thereof.

Referring to FIGS. 27 and 28, the elastic member 551 may be formed by bending a wire rod in such a manner in which the central portion is supported on support members 553 mounted on the second cover unit 521c, the opposite ends are supported on support protrusions 529a respectively extending from the gears (or the blades 527), and may provide an elastic force that acts in a direction of biasing the opposite ends thereof away from each other. As the blades 527 are pivoted, the support protrusions 529a may move along a circular arc-shaped trace on the second cover unit 521c. For example, the second cover unit 521c may be formed with guide holes 521d that respectively follow the moving traces of the support protrusions 529a, and the support protrusions 529a may protrude to the outside of the second cover unit 521c through the guide holes 521d so that each of the support protrusions 529a can support one of the ends of the elastic member 551.

The guide holes 521d may be formed and arranged such that 1) when the blades 527 are expanded, the support protrusions 529a are positioned closest to each other, and/or 2) when the blades 527 are positioned to be parallel with each other at one side thereof, the support protrusions 529a are positioned farthest from each other within the range of pivoting the blades 527. Because the elastic member 551 provides an elastic force that acts in a direction of moving the opposite ends thereof away from each other, the support protrusions 529a may tend to move away from each other by the elastic force of the elastic member 551. For example, when the thrust generating device 500 does not operate (when no centrifugal force acts), the blades 527 may be maintained while being positioned parallel with each other at one side thereof.

The guide holes 521d may be formed and arranged such that 1) when the blades 527 are expanded, the support protrusions 529a are positioned farthest from each other, and/or 2) when the blades 527 are positioned to be parallel with each other at one side thereof, the support protrusions 529a are positioned closest to each other within the range of pivoting the blades. In this case, the elastic member is capable of providing an elastic force that acts in a direction of making the opposite ends thereof approach to each other.

The elastic force of the elastic member 551 may be larger than, equal to, or smaller than the centrifugal force that acts on the blades 527 according to the operation of the thrust generating device 500. For example, the centrifugal force acting on the blades 527 may vary according to the rotation speed of the propeller that includes the blades 527. When the UAV drives the thrust generating device 500 (e.g., the propeller) such that the centrifugal force is larger than the elastic force of the elastic member 551, the blades 527 may be aligned in the diametric direction of the rotating region (rotating plane) of the propeller by the centrifugal force.

Referring to FIGS. 29 and 30, the elastic member 651 may include a tension coil spring (that provides an elastic force acting on a direction of making the opposite ends thereof come close to each other). When the elastic member 651 is provided as a tension coil spring, a pair of tension springs may independently provide an elastic force of pivoting the gears and/or the blades 627 as each of the tension springs is supported on the second cover unit 621c and a support protrusion 629a. The elastic member 651 may include a compression coil spring (that provides an elastic force that acts in a direction of making the opposite ends thereof go away from each other). When the elastic member 651 is a compression coil spring, the opposite ends of the elastic member 651 are supported on one of the support protrusions 629a such that the elastic member 651 is capable of providing an elastic force that acts in a direction of making the support protrusions 629a move away from each other. The support protrusions 629a may move along guide holes 621d formed in the second cover unit 621c according to the elastic force of the elastic members 651 and/or the centrifugal force generated according to the operation of the thrust generating device 600.

A propeller (and/or a thrust generating device) may be provided with blades interlocked with each other by the above-mentioned gears is combined with a stopper structure that is illustrated in FIG. 24. A propeller (and/or a thrust generating device) may be provided with blades interlocked with each other by the above-mentioned gears is combined with the structure of the elastic member that is illustrated in FIG. 27. A propeller (and/or a thrust generating device) may be provided with the stopper structure illustrated in FIG. 24 that is combined with the structure of the elastic member illustrated in FIG. 27. A propeller (and/or a thrust generating device) may be provided with blades interlocked with each other by the above-mentioned gears is combined with the stopper structure illustrated in FIG. 24 and/or the structure of the elastic member illustrated in FIG. 27.

As described above, an aerial vehicle and/or UAV is configured to generate a thrust and/or a lift by using at least one propeller having a rotor wing structure in which the blades of the propeller are interlocked with each other to offset the lift generated when the propeller is rotated. The blades may be pivoted to a position where the blades are aligned to be parallel with each other at one side thereof to be positioned on another structure (e.g., the frame) of the aerial vehicle, which may allow an occupied space to be reduced. As such, the aerial vehicle can be conveniently moved or stored. In the interlocking between the blades, gears, stoppers, or elastic members may be used, such that the blades may be expanded to predetermined positions by the rotation of the propeller, and the drag acting on blades can be offset to secure an excellent thrust performance.

Figure 31:
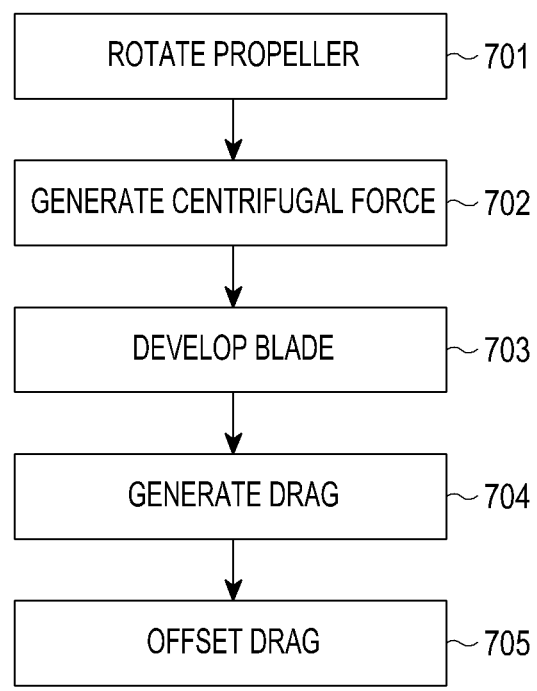
FIG. 31 is a flowchart illustrating an operation of a propeller in a UAV according to an embodiment of the present disclosure.

FIG. 31 is a flowchart illustrating an operation of a propeller in a UAV according to an embodiment of the present disclosure.

Specifically, FIG. 31 illustrates an operation in which the drag acting on each of the blades is offset as the thrust generating device (e.g., the thrust generating device 200 in FIG. 8) is operated while the blades (e.g., the blades 227 in FIG. 8) are aligned to be parallel with each other at one side thereof. Before the thrust generating device is operated, while the propeller is stopped, the blades may be maintained to be parallel with each other at one side thereof. While the blades are aligned to be parallel with each other at one other at one side thereof, the blades may be positioned within the rotating region (and/or the rotating plane) of the propeller. When the blades 427 are aligned to be parallel with each other at one side thereof, the blades 427 may be positioned on another structure (e.g., the frame 211 in FIG. 8) of the UAV while being positioned within the rotating region (and/or the rotating plane) of the propeller.

Referring to FIG. 31, in step 701, the thrust generating device operates, and the propeller rotates. As the propeller rotates, the blades that are aligned in parallel with each other at one side thereof are also rotated around the rotation axis of the propeller.

In step 702, as the blades rotate around the rotation axis of the propeller, a centrifugal force acts on each of the blades.

When the rotational speed of the propeller increases, the centrifugal force also increases. Accordingly, in step 703, at least one blade may pivot on the hub (e.g., the hub 221 in FIG. 8) from the centrifugal force, to be aligned in the diametric direction of the rotating region (and/or the rotating plane) of the propeller. Because the blades are interlocked with each other on the hub, when one blade pivots in any one direction, the other blade pivots in the opposite direction thereto, to be aligned in the diametric direction of the rotating region (and/or the rotating plane) of the propeller. When the UAV further includes an elastic member (e.g., the elastic member 551 in FIG. 27) that acts in a direction where the thrust generating device and/or the propeller align the blades to be parallel with each other at one side thereof, the blades may expanded (e.g., be aligned in the diametric direction of the rotating region (and/or the rotating plane) of the propeller) when the centrifugal force is larger than the elastic force of the elastic member.

While the propeller rotates, a drag may be generated to act on each of the blades. However, because the drag is very small until the blades are expanded, the blades may be pivoted on the hub from the position where the blades are aligned to be parallel with each other at one side thereof, thereby being expanded.

After the blades are expanded, in step 704, a drag according to air resistance may be generated on each of the blades that are rotated around the rotation axis of the propeller.

In step 705, the drag generated from the blades and/or acting on the blades may be offset as the blades are interlocked with each other. For example, when the blades are made to be interlocked with each other by using gears (e.g., the gears 229 in FIG. 8) in mounting the blades on the hub, the drags acting one the blades may be offset by the gears.

Referring again to FIG. 8, when the propeller is rotated counterclockwise, the drag acting on the blades 227 may pivot the blades 227 clockwise with respect to the hub 221. For example, the two gears 229 may tend to rotate clockwise, but the gears 229 cannot rotate in the same direction (e.g., clockwise) because they are engaged with each other within the hub 221. Thus, the drag acting on the blades 227 can be offset.

When the operation of the thrust generating device (e.g., the rotation of the propeller) is stopped, the centrifugal force acting on the blades may disappear. The propeller may be provided with an elastic member so as to provide an elastic force acting in a direction where the blades are aligned to be parallel with each other at one side thereof. For example, in a UAV according to an embodiment of the present disclosure, the thrust generating device and/or the propeller may align the blades to be parallel with each other at one side thereof by using an elastic member when the rotation of the propeller is stopped.

As described above, according to an embodiment of the present disclosure, an UAV may include a main body; a plurality of frames each extending from the main body; and a thrust generating device mounted on each of the frames and including a propeller to generate a thrust or lift. The propeller may include: a hub that provides a rotation axis of the propeller, and rotates according to an operation of the thrust generating device; and at least a pair of blades, each of which is pivotably mounted on the hub, and generates a thrust or lift while rotating around the rotation axis as the hub is rotated. The blades may be pivotably interlocked with each other such that the blades may be aligned to a position where the blades are parallel with each other on the hub in the first arrangement or aligned in a diametric direction of a rotating region of the propeller in the second arrangement.

As the hub is rotated, the blades may be aligned in the diametric direction of the rotating region of the propeller so as to offset a drag that is generated from each of the blades.

The propeller may further include gears, each of which is provided on one end of one of the blades, and the gears may be rotatably mounted on the hub in a state of being engaged with each other so as to interlock the blades with each other.

The hub may include a first cover unit; at least a pair of bosses, each of which extends from one surface of the first cover unit, and is disposed at a position that is spaced apart from the rotation axis; and a second cover unit fastened to the bosses in a state of facing the first cover unit, and each of the gears may be rotatably coupled to one of the bosses between the first cover unit and the second cover unit.

The propeller may further include a fixing hole formed in one end of each of the blades. One end of each of the blades may be inserted into one side of the gears, and one of the bosses may be rotatably coupled to the fixing hole.

Each of the gears may include a guide portion formed on a surface that faces the first cover unit or the second cover unit, and the guide portion may be in point contact or line contact with the first cover unit or the second cover unit.

The propeller may further include an elastic member, and each of the blades may receive an elastic force of the elastic member to be pivoted to a position where the blades are aligned to be parallel with each other at one side thereof.

As the hub is rotated, a centrifugal force that is larger than the elastic force of the elastic member may be generated to align the blades in the diametric direction of the rotating region of the propeller.

The propeller may include a stopper recess formed on one end of each of the blades, and a stopper mounted on the hub. When each of the blades is aligned in the diametric direction of the rotating region of the propeller, the stopper may be engaged with the stopper recess so as to fix each of the blades to the hub.

The propeller may further include a stationary blade fixed to the hub, and the blades may be pivoted with respect to the hub to be aligned to a position where the blades are aligned to be parallel with the stationary blade or to be aligned in the diametric direction of the rotating region of the propeller.

An aerial vehicle according to an embodiments of the present disclosure may include a plurality of driving motors, and a propeller provided to each of the driving motors. The propeller may include a hub rotated according to an operation of a driving motor to which the propeller is provided; a pair of gears, each of which is rotatably mounted on the hub, the gears being disposed to be symmetric to each other with reference to a rotation axis of the hub; and blades that extend from the gears, respectively.

The blades may be at least pivoted between a position where the blades are aligned to be parallel with each other at one side thereof and a position where the blades are aligned in a diametric direction of a rotating region of the propeller, the blades may be rotated around the rotation axis to generate a thrust or lift as the hub is rotated, and the gears may be engaged with each other to interlock the blades with each other.

As the hub is rotated, the blades may be aligned in the diametric direction of the rotating region of the propeller, and the gears may offset a drag that is generated from each of the blades.

Each of the gears may include: a rotation hole that is formed to penetrate opposite surfaces of each of the gears along a rotation axis direction of each of the gears; and a mounting hole that extends in a direction perpendicular to the rotation axis from a side surface of each of the gears. One end of each of the blades may be inserted into and mounted in the mounting hole.

The propeller may further include a fixing hole formed in one end of each of the blades, and each of the blades may be mounted in the mounting hole in a state where the fixing hole is aligned to a rotation hole.

The hub may include a rotary shaft that extends from each driving motor, and is rotated by the driving motor; a first cover unit mounted on the rotary shaft; and a second cover unit coupled to face the first cover unit. Each of the gears may be rotatably mounted between the first cover unit and the second cover unit.

The hub may further include bosses, each of which extends from one surface of the first cover unit, and the bosses may be disposed at positions that are spaced apart from the rotation axis, and each of the gears may be rotatably coupled to one of the bosses.

The propeller may further include a guide portion formed on at least one surface of each of the gears, and the guide portion may be in point contact or line contact with the first cover unit or the second cover unit.

The propeller may further include an elastic member mounted on the hub, and the elastic member may provide a driving force to rotate at least one of the gears, and the blades may be aligned to be parallel with each other at one side thereof by the driving force of the elastic member.

When a centrifugal force acting on each of the blades when the propeller is rotated becomes larger than the driving force of the elastic member, each of the blades may be aligned in the diametric direction of the rotating region of the propeller.

While the present disclosure has been shown and described with reference to certain embodiments thereof, it will be understood by those skilled in the art that various changes in form and details may be made therein without departing from the spirit and scope of the present disclosure as defined by the appended claims and any equivalents thereof.

What is claimed is:

1. An unmanned aerial vehicle (UAV), comprising:
   a main body;
   a plurality of frames extending from the main body; and
   a plurality of thrust generating devices respectively mounted on the plurality of frames, each of the thrust generating devices including a propeller,
   wherein the propeller includes:
   a hub that provides a rotation axis of the propeller, and rotates according to an operation of the thrust generating device,
   a pair of blades, each blade of the pair of blades being pivotably mounted on the hub, configured to generate a thrust or lift while rotating around the rotation axis as the hub is rotated,
   a stationary blade fixed to the hub, and
   an elastic member configured to provide an elastic force to each of the pair of blades to pivot the pair of blades to the folded position, and
   wherein the pair of blades are pivotably interlocked with each other such that the pair of blades are configured to be aligned in a folded position in which the pair of blades are substantially parallel with the stationary blade on the hub in a first arrangement or arranged radially in an expanded position in a rotating region of the propeller in a second arrangement.

2. The UAV of claim 1, wherein as the hub is rotated, the pair of blades are configured to be arranged radially in the expanded position in the rotating region of the propeller and to offset a drag that is generated from each of the blades.

3. The UAV of claim 1, wherein the propeller further includes a pair of gears, each gear of the pair of gears being provided at an end of a respective blade of the pair of blades, and wherein the pair of gears are rotatably mounted on the hub and are configured to be engaged with each other to interlock the pair of blades with each other.

4. The UAV of claim 3, wherein the hub includes:

a first cover unit;

a pair of bosses, each boss of the pair of bosses extending from a surface of the first cover unit, and being disposed at a position that is spaced apart from the rotation axis; and a second cover unit fastened to the pair of bosses and facing the first cover unit, wherein each gear of the pair of gears is rotatably coupled to a respective one of the pair bosses between the first cover unit and the second cover unit.

5. The UAV of claim 4, wherein the propeller further includes a pair of fixing holes, each fixing hole of the pair of fixing holes being formed in an end of a respective blade of the pair of blades, and wherein the end of the respective blade of the pair of blades is inserted into a side of a respective gear of the pair of gears, and one of the pair of bosses is rotatably coupled to the fixing hole.

6. The UAV of claim 4, wherein each of the pair of gears includes a guide portion that faces the first cover unit or the second cover unit, and wherein the guide portion is configured to be in point contact or line contact with the first cover unit or the second cover unit.

7. The UAV of claim 1, wherein the blades are configured to be arranged in the expanded position in response to a centrifugal force generated by a rotation of the hub that is larger than the elastic force of the elastic member.

8. The UAV of claim 1, wherein the propeller further includes:

a stopper recess formed on each of the pair of blades; and a stopper mounted on the hub, and wherein, while each of the blades is aligned in the expanded position, the stopper is engaged with the stopper recess to fix each of the blades to the hub.

9. An aerial vehicle, comprising:

a plurality of driving motors; and a plurality of propellers respectively provided to the plurality of driving motors, wherein each of plurality of the propellers includes:

a hub that rotates according to an operation of a driving motor to which the propeller is provided;

a pair of gears, each gear of the pair of gears being rotatably mounted on the hub, the pair of gears being disposed to be symmetric to each other with reference to a rotation axis of the hub;

a pair of blades, each blade of the pair of blades extending from a respective gear of the pair of gears;

a stationary blade fixed to the hub; and an elastic member mounted on the hub and configured to provide a driving force to rotate at least one of the pair of gears, such that the pair of blades are aligned in the folded position, wherein the pair of blades are configured to pivot between a folded position where the pair of blades are aligned to be substantially parallel with the stationary blade when the propeller is not rotating, and an expanded position where the pair of blades are arranged radially in a rotating region of the propeller when the propeller is rotating, and wherein the pair of blades are capable of rotating around the rotation axis to generate a thrust or lift as the hub rotates, and the pair of gears are engaged with each other to interlock the pair of blades with each other.

10. The aerial vehicle of claim 9, wherein, in response to a rotation of the hub, the pair of blades are configured to be arranged radially in the expanded position in the rotating region of the propeller, and the pair of gears are configured to offset a drag that is generated from each of the blades.

11. The aerial vehicle of claim 9, wherein each gear of the pair of gears includes:

a rotation hole that is formed to penetrate opposite surfaces of each gear along a rotation axis direction; and a mounting hole that extends in a direction perpendicular to the rotation axis from a side surface of each gear, and wherein an end of a respective blade of the pair of blades is inserted into, and mounted in, the mounting hole.

12. The aerial vehicle of claim 11, wherein the propeller further includes a pair of fixing holes, each fixing hole of the pair of fixing holes being formed in a respective blade of the pair of blades, and wherein the respective blade of the pair of blades is mounted in the mounting hole while the fixing hole is aligned to a rotation hole.

13. The aerial vehicle of claim 9, wherein the hub includes:

a rotary shaft that extends from each driving motor, and is capable of being rotated by the driving motor;

a first cover unit mounted on the rotary shaft; and a second cover unit coupled to face the first cover unit, and wherein each of the pair of gears is rotatably mounted between the first cover unit and the second cover unit.

14. The aerial vehicle of claim 13, wherein the hub further includes bosses, each of the bosses extending from a surface of the first cover unit, and wherein the bosses are disposed at positions that are spaced apart from the rotation axis, and each gear of the pair gears is rotatably coupled to a respective one of the bosses.

15. The aerial vehicle of claim 13, wherein the propeller further includes a guide portion formed on a surface of each of the gears, and wherein the guide portion is in point contact or line contact with the first cover unit or the second cover unit.

16. The aerial vehicle of claim 9, wherein the pair of blades are configured to be arranged in the expanded position in response to a centrifugal force generated by a rotation of the propeller that is larger than the driving force of the elastic member.

* * * * *